US012720369B2

(12) United States Patent
Cao et al.

(10) Patent No.: US 12,720,369 B2
(45) Date of Patent: Aug. 25, 2026

(54) COMMUNICATION METHOD AND COMMUNICATION APPARATUS

(71) Applicant: HUAWEI TECHNOLOGIES CO., LTD., Shenzhen (CN)

(72) Inventors: Longyu Cao, Shanghai (CN); Yaoguang Wang, Shanghai (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 18/515,973

(22) Filed: Nov. 21, 2023

(65) Prior Publication Data

US 2024/0089802 A1 Mar. 14, 2024

Related U.S. Application Data

(63) Continuation of application No. PCT/CN2022/088342, filed on Apr. 22, 2022.

(30) Foreign Application Priority Data

May 28, 2021 (CN) ......................... 202110592819.1

(51) Int. Cl.
*H04W 28/24* (2009.01)
*H04W 28/06* (2009.01)
*H04W 36/30* (2009.01)

(52) U.S. Cl.
CPC ........... *H04W 28/24* (2013.01); *H04W 28/06* (2013.01); *H04W 36/304* (2023.05)

(58) Field of Classification Search
CPC ... H04W 28/24; H04W 28/06; H04W 36/304; H04W 28/0226; H04W 28/0268; H04W 4/025; H04W 12/02; H04W 12/72
See application file for complete search history.

(56) References Cited

U.S. PATENT DOCUMENTS

2018/0367288 A1* 12/2018 Vrzic .................... H04W 76/12
2020/0260333 A1* 8/2020 Kousaridas ............. H04W 4/40
(Continued)

FOREIGN PATENT DOCUMENTS

WO 2021063840 A1 4/2021

OTHER PUBLICATIONS

3rd Generation Partnership Project; Technical Specification Group Services and System Aspects; Procedures for the 5G System (5GS); Stage 2 (Release 17), 3GPP TS 23.502 V17.0.0 (Mar. 2021), total 646 pages.

(Continued)

*Primary Examiner* — Liem H. Nguyen
(74) *Attorney, Agent, or Firm* — Rimon PC

(57) ABSTRACT

Embodiments of this application provide for a communication method and a related apparatus. In the method, an access and mobility management function network element receives a first correspondence between a first identifier and a quality of experience (QoE) target. The first correspondence includes the first identifier, the first identifier indicates an identifier of a first terminal device at an application layer, and the QoE target indicates a service QoE target of the first terminal device. The access and mobility management function network element determines a second identifier based on the first identifier. The access and mobility management function network element sends a second correspondence between the second identifier and the QoE target, where the second identifier indicates an identifier of the first terminal device in a network. According to the foregoing method, a service QoE requirement for a specified terminal device can be met.

17 Claims, 7 Drawing Sheets

(56) References Cited

U.S. PATENT DOCUMENTS

| | | | | |
|---|---|---|---|---|
| 2021/0105656 | A1* | 4/2021 | Estevez | H04W 24/08 |
| 2022/0021642 | A1* | 1/2022 | Wang | H04W 8/10 |
| 2022/0417799 | A1* | 12/2022 | Schnitzler | H04W 28/24 |
| 2023/0247413 | A1* | 8/2023 | Ren | H04W 76/30<br>370/329 |
| 2023/0261996 | A1* | 8/2023 | Báder | H04L 41/0894<br>370/236 |
| 2023/0388389 | A1* | 11/2023 | Xin | H04L 67/1097 |
| 2024/0064554 | A1* | 2/2024 | Báder | H04W 28/0268 |

OTHER PUBLICATIONS

China Unicom: "Summary of email discussion on QoE." 3GPP TSG RAN Meeting #86 Sitges, Spain, Dec. 9-12, 2019, RP-192902, total 8 pages.

3rd Generation Partnership Project; Technical Specification Group Services and System Aspects; Management and orchestration; Generic management services; (Release 16), 3GPP TS 28.532 V16.7.0 (Mar. 2021), total 230 pages.

3rd Generation Partnership Project; Technical Specification Group Services and System Aspects; Management and orchestration; Performance assurance (Release 16), 3GPP TS 28.550 V16.7.0 (Dec. 2020), total 85 pages.

3rd Generation Partnership Project; Technical Specification Group Radio Access Network; NR; NR and NG-RAN Overall Description; Stage 2 (Release 16), 3GPP TS 38.300 V16.5.0 (Mar. 2021), total 151 pages.

* cited by examiner

COMMUNICATION METHOD AND COMMUNICATION APPARATUS

CROSS-REFERENCE TO RELATED APPLICATIONS

This application is a continuation of International Patent Application No. PCT/CN2022/088342, filed on Apr. 22, 2022, which claims priority to Chinese Patent Application No. 202110592819.1, filed on May 28, 2021. The disclosures of the aforementioned applications are hereby incorporated by reference in their entireties.

TECHNICAL FIELD

This application generally relates to the field of communication technologies, and more specifically, to a communication method and a related communication apparatus.

BACKGROUND

Fifth generation (5G) networks provide a variety of service types to users and also provides a more refined quality of service (QoS) mechanism that ensures a higher quality of experience (QoE) service to the users.

As an evaluation metric, QoE can be used to evaluate a comprehensive and subjective satisfaction of users of the network based on a quality and a performance of a network, a system, and a device, an application, or a service in the network. For example, QoE for a user may be negatively impacted in response to a video being watched by a user undergoes frame freezing, in response to the audio of the being not being continuous, and the like.

Currently, in a QoS mechanism based on a core network, a corresponding QoS is determined based on a requirement for a service granularity, and a same QoS is allocated to all user equipment (UE(s)) that access a same service. Therefore, a current QoS mechanism cannot meet different requirements for a service quality of experience of all the UE that access the same service.

Therefore, how to ensure a QoE service requirement for a specified UE is an urgent problem that needs to be resolved currently.

SUMMARY

Embodiments of this application provide a communication method and a related communication apparatus, to meet a service quality of experience (QoE) requirement for a specified first terminal device.

According to a first aspect, a communication method is provided. In the method, an access and mobility management function network element receives a first correspondence between a first identifier and a QoE target, where the first correspondence includes the first identifier, the first identifier indicates an identifier of a first terminal device at an application layer, and the QoE target indicates a service QoE target of the first terminal device. The access and mobility management function network element determines a second identifier based on the first identifier, where the second identifier indicates an identifier of the first terminal device in a network layer. The access and mobility management function network element sends a second correspondence between the second identifier and the QoE target.

According to the foregoing technical solution, in this application, a problem relating to a conversion of an identifier for a specified first terminal device can be resolved on the premise of ensuring privacy security of the specified first terminal device, and a service QoE requirement for the specified first terminal device can be ensured.

With reference to the first aspect, in some possible implementations of the first aspect, that the access and mobility management function network element determines a second identifier based on the first identifier includes that the access and mobility management function network element determines an international mobile subscriber identity (IMSI) of the first terminal device based on the first identifier. The access and mobility management function network element determines the second identifier based on the IMSI.

According to the foregoing technical solution, the access and mobility management function network element can determine a corresponding IMSI based on the first identifier of the first terminal device obtained by the access and mobility management function network element, and determine the second identifier of the first terminal device based on the IMSI of the first terminal device, to determine an identifier of the first terminal device in a network. This helps a radio access management controller or an operation, administration, and maintenance (OAM) network element correctly identify the first terminal device, so that the service QoE requirement for the specified first terminal device is met.

With reference to the first aspect, in some possible implementations of the first aspect, that an access and mobility management function network element receives a first correspondence between a first identifier and a QoE target includes that the access and mobility management function network element receives the first correspondence from a network exposure function network element.

With reference to the first aspect, in some possible implementations of the first aspect, that the access and mobility management function network element sends a second correspondence between the second identifier and the QoE target includes that the access and mobility management function network element sends the second correspondence to a wireless network device.

With reference to the first aspect, in some possible implementations of the first aspect, the QoE target is used to determine an optimization policy of the first terminal device, and the optimization policy is used to enable QoE of the first terminal device to achieve the QoE target.

According to a second aspect, a communication method is provided. The method includes that an access and mobility management function network element receives a first identifier, where the first identifier indicates an identifier of a first terminal device at an application layer. The access and mobility management function network element determines a second identifier based on the first identifier. The access and mobility management function network element sends the second identifier, where the second identifier indicates an identifier of the first terminal device in a network.

According to the foregoing technical solution, in this application, a problem relating to a conversion of an identifier for a specified first terminal device can be resolved on the premise of ensuring privacy security of the specified first terminal device, and a service QoE requirement for the specified first terminal device can be ensured.

With reference to the second aspect, in some possible implementations of the second aspect, that the access and mobility management function network element determines a second identifier based on the first identifier includes that the access and mobility management function network element determines an IMSI of the first terminal device based on the first identifier, and determines the second identifier based on the IMSI of the first terminal device.

According to the foregoing technical solution, the access and mobility management function network element can first determine a corresponding identity based on the first identifier of the first terminal device obtained by the access and mobility management function network element, and determine the second identifier of the first terminal device based on the identity of the first terminal device, to determine the identifier of the first terminal device in the network. This helps a radio access management controller or an OAM network element correctly identify the first terminal device, so that the requirement for the service QoE of the first terminal device is met.

With reference to the second aspect, in some possible implementations of the second aspect, the access and mobility management function network element receives the first identifier from the radio access management controller, the OAM network element, a network exposure function network element, or a network data analysis function network element.

With reference to the second aspect, in some possible implementations of the second aspect, the access and mobility management function network element sends the second identifier to the radio access management controller, the OAM network element, the network exposure function network element, or the network data analysis function network element.

With reference to the second aspect, in some possible implementations of the second aspect, the access and mobility management function network element further sends location information of the first terminal device to the radio access management controller, the OAM network element, the network exposure function network element, or the network data analysis function network element.

According to the foregoing technical solution, the access and mobility management function network element sends the location information of the first terminal device to the radio access management controller, the OAM network element, the network exposure function network element, or the network data analysis function, so that the radio access management controller, the OAM network element, the network exposure function network element, or the network data analysis function can determine, based on the location information of the first terminal device, a wireless network device serving the first terminal device, a radio intelligent controller serving the first terminal device, a network element serving the first terminal device, or the like, to finally meet the requirement for the service QoE of the first terminal device.

According to a third aspect, a communication method is provided. The method includes that a first device receives a first identifier and a QoE target from an application server (AS), where the first identifier indicates an identifier of a first terminal device at an application layer, and the QoE target indicates a service QoE target of the first terminal device. The first device sends the first identifier to an access and mobility management function network element. The first device receives a second identifier from the access and mobility management function network element, where the second identifier indicates an identifier of the first terminal device in a network. The first device sends a correspondence between the second identifier and the QoE target.

According to the foregoing technical solution, the first device sends the first identifier of the first terminal device to the access and mobility management function network element, and obtains the second identifier of the first terminal device from the access and mobility management function network element. The first device can correctly identify that the first terminal device is a specified terminal device by obtaining the second identifier of the first terminal device from the access and mobility management function network element, so that a service QoE requirement for the specified first terminal device is met.

With reference to the third aspect, in some possible implementations of the third aspect, that the first device sends a correspondence between the second identifier and the QoE target includes that when the first device is an OAM network element, the OAM network element sends the correspondence to a wireless network device; or when the first device is a radio access management controller, the radio access management controller sends the correspondence to a radio access intelligent controller.

With reference to the third aspect, in some possible implementations of the third aspect, the method further includes that the first device further receives location information of the first terminal device.

According to the foregoing technical solution, the first device receives the location information of the first terminal device, and can determine, based on the location information of the first terminal device, a wireless network device serving the first terminal device, or a radio intelligent controller serving the first terminal device, or a network element serving the first terminal device, or the like, to meet the service QoE requirement for the first terminal device.

With reference to the third aspect, in some possible implementations of the third aspect, the QoE target is used to determine an optimization policy of the first terminal device, and the optimization policy is used to enable QoE of the first terminal device to achieve the QoE target.

With reference to the third aspect, in some possible implementations of the third aspect, the method further includes that the first device sends second identifier type information to the access and mobility management function network element, where the second identifier type information indicates a type of the second identifier of the first terminal device.

According to the foregoing technical solution, the first device sends the second identifier type information of the first terminal device to the access and mobility management function network element, so that the access and mobility management function network element finds the second identifier of the first terminal device in an expedited manner and may correctly feedback the second identifier to the first device.

According to a fourth aspect, a communication method is provided. The method includes that a radio access management controller receives a first identifier and a QoE target from an AS. The first identifier indicates an identifier of a first terminal device at an application layer, and the QoE target indicates a service QoE target of the first terminal device. The radio access management controller sends the first identifier to an access and mobility management function network element. The radio access management controller receives a second identifier from the access and mobility management function network element, where the second identifier indicates an identifier of the first terminal device in a network layer. The radio access management controller sends the second identifier to a wireless network device, where the second identifier is used to request data of the first terminal device. The radio access management controller receives the data of the first terminal device from the wireless network device. The radio access management controller determines an optimization policy based on the data of the first terminal device and the QoE target, where the optimization policy is used to enable QoE of the first terminal device to achieve the QoE target. The radio access management controller sends the optimization policy to a radio access intelligent controller.

According to the foregoing technical solution, the radio access management controller sends the first identifier of the first terminal device to the access and mobility management function network element, and obtains the second identifier of the first terminal device from the access and mobility management function network element. The radio access management controller can correctly identify that the first terminal device is a specified terminal device by obtaining the second identifier of the first terminal device from the access and mobility management function network element, so that a service QoE requirement for the specified first terminal device is met.

With reference to the fourth aspect, in some possible implementations of the fourth aspect, the method further includes that the radio access management controller further receives location information of the first terminal device.

According to the foregoing technical solution, the first device receives the location information of the first terminal device, and can determine, based on the location information of the first terminal device, a wireless network device serving the first terminal device, or a radio intelligent controller serving the first terminal device, or a network element serving the first terminal device, or the like, to meet the service QoE requirement for the first terminal device.

With reference to the fourth aspect, in some possible implementations of the fourth aspect, the method further includes that the radio access management controller sends second identifier type information to the access and mobility management function network element, where the second identifier type information indicates a type of the second identifier of the first terminal device.

According to the foregoing technical solution, the radio access management controller sends the first identifier and the second identifier type information of the first terminal device to the access and mobility management function network element, so that the access and mobility management function network element finds the second identifier of the first terminal device in an expedited manner and may correctly feedback the second identifier to the radio access management controller.

According to a fifth aspect, a communication method is provided. The method includes that a wireless network device receives a correspondence between a second identifier and a QoE target, where the second identifier indicates an identifier of a first terminal device in a network, and the QoE target indicates a service QoE target of the first terminal device. The wireless network device processes the first terminal device based on the correspondence, where the processing enables QoE of the first terminal device to achieve the QoE target.

With reference to the fifth aspect, in some possible implementations of the fifth aspect, that the wireless network device processes the first terminal device based on the correspondence includes that when the wireless network device determines that the QoE of the first terminal device does not meet the QoE target, the wireless network device improves QoS of the first terminal device, or the wireless network device hands over the first terminal device to a first cell, where the first cell meets the QoE target.

According to the foregoing technical solution, based on the foregoing processing, the wireless network device can enable the QoE of the first terminal device to achieve the QoE target of the first terminal device, so that a service QoE requirement for the first terminal device is met.

According to a sixth aspect, a communication apparatus is provided. The apparatus includes a transceiver unit that is configured to receive a first correspondence between a first identifier and a QoE target, where the first correspondence includes the first identifier, the first identifier indicates an identifier of a first terminal device at an application layer, and the QoE target indicates a service QoE target of the first terminal device. The apparatus further includes a processing unit that is configured to determine a second identifier based on the first identifier, where the second identifier indicates an identifier of the first terminal device in a network. The transceiver unit is further configured to send a second correspondence between the second identifier and the QoE target.

With reference to the sixth aspect, in some possible implementations of the sixth aspect, the processing unit is configured to determine an IMSI of the first terminal device based on the first identifier and determine the second identifier based on the IMSI.

With reference to the sixth aspect, in some possible implementations of the sixth aspect, the transceiver unit is configured to receive the first correspondence from a network exposure function network element.

With reference to the sixth aspect, in some possible implementations of the sixth aspect, the transceiver unit is configured to send the second correspondence to a wireless network device.

With reference to the sixth aspect, in some possible implementations of the sixth aspect, the QoE target is used to determine an optimization policy of the first terminal device, and the optimization policy is used to enable QoE of the first terminal device to achieve the QoE target.

According to a seventh aspect, a communication apparatus is provided. The apparatus includes a transceiver unit that is configured to receive a first identifier, where the first identifier indicates an identifier of a first terminal device at an application layer. The communication apparatus further includes a processing unit that is configured to determine a second identifier based on the first identifier, where the second identifier indicates an identifier of the first terminal device in a network. The transceiver unit is further configured to send the second identifier.

With reference to the seventh aspect, in some possible implementations of the seventh aspect, the processing unit is configured to determine an IMSI of the first terminal device based on the first identifier and determine the second identifier based on the IMSI.

With reference to the seventh aspect, in some possible implementations of the seventh aspect, the transceiver unit is configured to receive the first identifier from a radio access management controller, an OAM network element, a network exposure function network element, or a network data analysis function network element.

With reference to the seventh aspect, in some possible implementations of the seventh aspect, the transceiver unit is configured to send the second identifier to the radio access management controller, the OAM network element, the network exposure function network element, or the network data analysis function network element.

With reference to the seventh aspect, in some possible implementations of the seventh aspect, the transceiver unit is further configured to send location information of the first terminal device to the radio access management controller, the OAM network element, the network exposure function network element, or the network data analysis function network element.

According to an eighth aspect, a communication apparatus is provided. The apparatus includes a transceiver unit that is configured to receive a first identifier and a QoE target from an AS, where the first identifier indicates an identifier of a first terminal device at an application layer, and the QoE target indicates a service QoE target of the first terminal device. The transceiver unit is further configured to send the first identifier to an access and mobility management function network element. The transceiver unit is further configured to receive a second identifier from the access and mobility management function network element, where the second identifier indicates an identifier of the first terminal device in a network. The transceiver unit is further configured to send a correspondence between the second identifier and the QoE target.

With reference to the eighth aspect, in some possible implementations of the eighth aspect, when the communication apparatus is an OAM network element, the transceiver unit is further configured to send the correspondence to a wireless network device. Alternatively, when the communication apparatus is a radio access management controller, the transceiver unit is further configured to send the correspondence to a radio access intelligent controller.

With reference to the eighth aspect, in some possible implementations of the eighth aspect, the transceiver unit is further configured to receive location information of the first terminal device.

With reference to the eighth aspect, in some possible implementations of the eighth aspect, the QoE target is used to determine an optimization policy of the first terminal device, and the optimization policy is used to enable QoE of the first terminal device to achieve the QoE target.

With reference to the eighth aspect, in some possible implementations of the eighth aspect, the transceiver unit is further configured to send second identifier type information to the access and mobility management function network element, where the second identifier type information indicates a type of the second identifier of the first terminal device.

According to a ninth aspect, a communication apparatus is provided. The apparatus includes a transceiver unit, configured to receive a first identifier and a QoE target from an AS, where the first identifier indicates an identifier of a first terminal device at an application layer, the QoE target indicates a service QoE target of the first terminal device, the transceiver unit is further configured to send the first identifier to an access and mobility management function network element, the transceiver unit is further configured to receive a second identifier from the access and mobility management function network element, the second identifier indicates an identifier of the first terminal device in a network layer, the transceiver unit is further configured to send the second identifier to a wireless network device, the second identifier is used to request data of the first terminal device, and the transceiver unit is further configured to receive the data of the first terminal device from the wireless network device. The apparatus further includes a processing unit that is configured to determine an optimization policy based on the data and the QoE target, where the optimization policy is used to enable QoE of the first terminal device to achieve the QoE target. The transceiver unit is further configured to send the optimization policy to a radio access intelligent controller.

With reference to the ninth aspect, in some possible implementations of the ninth aspect, the transceiver unit is further configured to receive location information of the first terminal device.

With reference to the ninth aspect, in some possible implementations of the ninth aspect, the transceiver unit is further configured to send second identifier type information to the access and mobility management function network element, where the second identifier type information indicates a type of the second identifier of the first terminal device.

According to a tenth aspect, a communication apparatus is provided. The apparatus includes a transceiver unit that is configured to receive a correspondence between a second identifier and a quality of experience QoE target, where the second identifier indicates an identifier of a first terminal device in a network, and the QoE target indicates a service QoE target of the first terminal device. The communication apparatus further includes a processing unit that is configured to process the first terminal device based on the correspondence, where the processing enables QoE of the first terminal device to achieve the QoE target.

With reference to the tenth aspect, in some possible implementations of the tenth aspect, the processing unit is configured to, when it is determined that the QoE of the first terminal device does not meet the QoE target, improve QoS of the first terminal device, or hand over the first terminal device to a first cell, where the first cell meets the QoE target.

According to an eleventh aspect, a communication apparatus is provided. The apparatus includes at least one processor. The at least one processor is configured to execute a computer program stored in a memory, to enable the apparatus to implement the method provided in any one of the first aspect to the fifth aspect or any possible implementation of the aspect.

According to a twelfth aspect, a computer-readable storage medium is provided. The computer-readable storage medium includes a computer program. When the computer program is run on a computer, the computer is enabled to perform the method provided in any one of the first aspect to the fifth aspect or any possible implementation of the aspect.

According to a thirteenth aspect, a computer program product is provided. The computer program product includes a computer program. When the computer program is run on a computer, the computer is enabled to perform the method provided in any one of the first aspect to the fifth aspect or any possible implementation of the aspect.

According to a fourteenth aspect, a chip system is provided. The chip system includes a processor that is configured to invoke a computer program from a memory and run the computer program, so that a communication device in which the chip system is installed is enabled to perform the method provided in any one of the first aspect to the fifth aspect or any possible implementation of the aspect.

According to a fifteenth aspect, a communication system is provided. The communication system includes an OAM network element and a wireless network device. The OAM network element is configured to perform the method according to any one of the third aspect or the possible implementations of the third aspect. The wireless network device is configured to perform the method according to any one of the fifth aspect or the possible implementations of the fifth aspect.

DESCRIPTION OF EMBODIMENTS

The following embodiments describe technical solutions of this application with reference to accompanying drawings.

The technical solutions in the embodiments of this application may be applied to various communication systems, such as a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, or new radio (NR), and may also be applied to a future communication system, such as a 6th generation (6G) system, and the like.

A terminal device in embodiments of this application may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a public land mobile network (PLMN), or the like. This is not limited in embodiments of this application.

A wireless network device in embodiments of this application may be a device configured to communicate with the terminal device. The wireless network device may be a base transceiver station (BTS) in a GSM system or a CDMA system, may be a NodeB (NB) in a WCDMA system, may be an evolved NodeB (eNB or eNodeB) in an LTE system, or may be a radio controller in a cloud radio access network (CRAN) scenario. Alternatively, the network device may be a relay station, an access point (AP), a vehicle-mounted device, a wearable device, a wireless network device in a 5G network, a wireless network device in a PLMN network, or the like. This is not limited in embodiments of this application.

Figure 1:
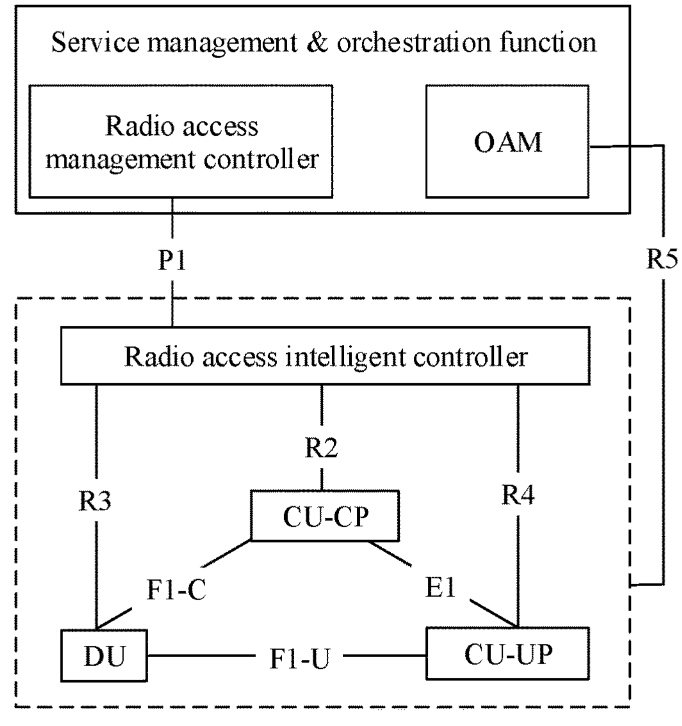
FIG. 1 is a schematic diagram of an open radio access network architecture.

The following describes related concepts in the embodiments of this application with reference to FIG. 1.

FIG. 1 is a schematic diagram of an open radio access network architecture. The following describes functions of components in a system architecture shown in FIG. 1.

A radio access management controller is configured to control and optimize latency-insensitive services of network elements and resources.

Optionally, the radio access management controller is further configured to execute an artificial intelligence learning (AI)/machine learning (ML) workflow. The workflow may include model training and update, and is used to manage a service (for example, a video service)/feature (for example, mobility handover) based on a policy.

A radio access intelligent controller is configured to implement data collection and send an optimization operation instruction through an R2/R3/R4 interface, to control and optimize a radio access network (RAN) function network element, such as a central unit control plane (CU-CP), a central unit user plane (CU-UP), and a distributed unit (DU), and a radio resource.

The R2 interface is an interface between the radio access intelligent controller and the CU-CP, and is configured to collect performance data from the CU-CP and deliver control information to the CU-CP.

The R3 interface is an interface between the radio access intelligent controller and the DU, and is configured to collect performance data from the DU and deliver the control information to the DU.

The R4 interface is an interface between the radio access intelligent controller and the CU-UP, and is configured to collect performance data from the CU-UP and deliver the control information to the CU-UP.

A CU-CP is a central unit control plane of a RAN and is configured to implement a radio resource control (RRC) protocol function and a packet data convergence protocol (PDCP) control plane function.

A CU-UP is a central unit user plane in the RAN is configured to implement a PDCP user plane function and a service data adaptation protocol (SDAP) function.

A DU is a distributed unit in the RAN and is configured to implement a radio link control (RLC)/media access control (MAC)/high physical layer (High-PHY) protocol function.

An operation, administration, and maintenance (OAM) network element is configured to provide operation and maintenance management for an open RAN function module.

For example, some functions of the OAM network element may be implemented by one or more of a network management system (NMS), an element management system (EMS), or an open network automation platform (ONAP).

For example, the NMS can be configured to implement cross-domain (for example, a wireless domain or a core network domain) network management.

The EMS can be configured to manage a wireless network device.

The ONAP can be configured to implement cross-domain network management, and is another implementation for implementing an OAM function.

From a perspective of a network architecture hierarchy relationship, the NMS and the ONAP are located at an uppermost layer, and may be connected to an EMS downward. The EMS is then connected to a network element, such as the CU-CP, the CU-UP, or the DU.

Optionally, the NMS and the ONAP may not be connected to the EMS, but are directly connected to the network element.

Based on an open radio access network architecture shown in FIG. 1, a policy based on a UE group including a plurality of UEs that have a same feature is provided in the industry, to meet requirements for service quality of experience (QoE) of different UEs in the UE group, and adaptive dynamic quality of service (QoS) adjustment for the UE group may be implemented with reference to a real-time status of a RAN network, so that user service experience of different UEs in the UE group is ensured.

For example, the same feature may be a location identifier. For example, a plurality of UEs are located in a same area, and the same area may be a cell. Alternatively, the same feature may be a service identifier, for example, a plurality of UEs access a same service. Alternatively, the same feature may be an application identifier, for example, a plurality of UEs have a same application identifier, and so on. This is not limited in this application.

It should be noted that, by using the same feature, an entire optimization policy may be determined for the UE group in the industry, and requirements for service quality of experience of different UEs in the UE group can be met.

In the system architecture shown in FIG. 1, the radio access management controller can receive a QoE target that is from an application server (AS) and that is for the UE group, may generate an optimization policy for the UE group based on the QoE target of the UE group, and send the optimization policy for the UE group to the radio access intelligent controller through a P1 interface shown in FIG. 1.

It should be noted that the optimization policy may include a service identifier and the QoE target. The service identifier may be a QoS class identifier (QCI) and identifies an application scope of the optimization policy. For example, the service identifier may indicate that all UEs accessing a service corresponding to the QCI are potential objects to which the optimization policy is applied.

Then, the radio access intelligent controller subscribes, based on a requirement of the optimization policy, to data used for data analysis from a RAN network element. The data may include related performance data and network-related data of all UEs in the UE group, and evaluates performance of all UEs in the UE group based on data reported by the RAN network element.

For example, the radio access intelligent controller calculates a QoE (e.g., QoE current) of all UEs in the UE group, and evaluates whether the QoE meets or surpasses the QoE target (e.g., QoE target) of the UE group.

If the radio access intelligent controller finds, through calculation, that the QoE of one or more UEs in the UE group does not meet the QoE target of the UE group, the radio access intelligent controller may further predict, based on network data, whether performance of a neighboring cell (cell QoE) can meet or surpass the QoE target. If a neighboring cell meets the QoE target, the radio access intelligent controller selects the cell as a target cell, and sends a policy control operation to the CU-CP through the R2 interface, to indicate to hand over the one or more UEs in the corresponding UE group to the target cell, to ensure service experience of the one or more UEs.

However, for a service scenario oriented to a vertical industry or a public network service scenario oriented to a common user, requirements for service QoE of some specified UEs need to be met.

For example, in a public safety and disaster relief scenario, an importance level of providing service to UE of a common rescue team member and an importance level of providing service to UE of a rescue team leader are different. In other words, how to more effectively and directly meet a requirement for service QoE of the UE of the rescue team leader is an example of a technical problem that urgently needs to be resolved currently.

Specifically, according to the technical solution described above, a common feature of the UE of the rescue team leader and the UE of the common rescue team member is that the UE of the rescue team leader and the UE of the common rescue team member are in a same public safety and disaster relief scenario. However, the UE of the rescue team leader has more features and capabilities than the UE of the common rescue team member. Therefore, if the foregoing scenario is processed according to the technical solution described above, a layer-by-layer screening process needs to be performed. The processing process is not targeted to specific UEs, and easily wastes valuable rescue time or more easily causes disadvantages such as a waste of a communication resource.

For another example, in an enterprise campus factory in a vertical industry, in some scenarios such as a precise control robot in a production line, an importance level of providing service to UE of a common control robot and an importance level of providing service to UE of a robot with a higher priority level are different. In other words, how to more effectively and directly ensure a requirement for service QoE of the UE of the robot with a higher level to enable the UE of the robot with a higher level to better complete work is an example of a technical problem that urgently needs to be resolved currently.

Specifically, according to the technical solution described above, a common feature of the UE of the robot with a higher priority level and the UE of the common robot is that the UE of the robot with a higher level and the UE of the common robot are in a same production workshop scenario. However, the UE of the robot with a higher level has more features and capabilities than the UE of the common robot. Therefore, if the foregoing scenario is processed according to the technical solution described above, a layer-by-layer screening process needs to be performed. The process is not targeted to specific UEs, and easily wastes valuable production time or more easily causes disadvantages such as a waste of a communication resource.

In view of the foregoing technical problems, this application provides a communication method. According to the method, in this application, a requirement for service QoE of specified UE can be more accurately, effectively, and directly met on the premise of protecting privacy security of the specified UE.

The following describes technical solutions of this application with reference to accompanying drawings.

Figure 2:
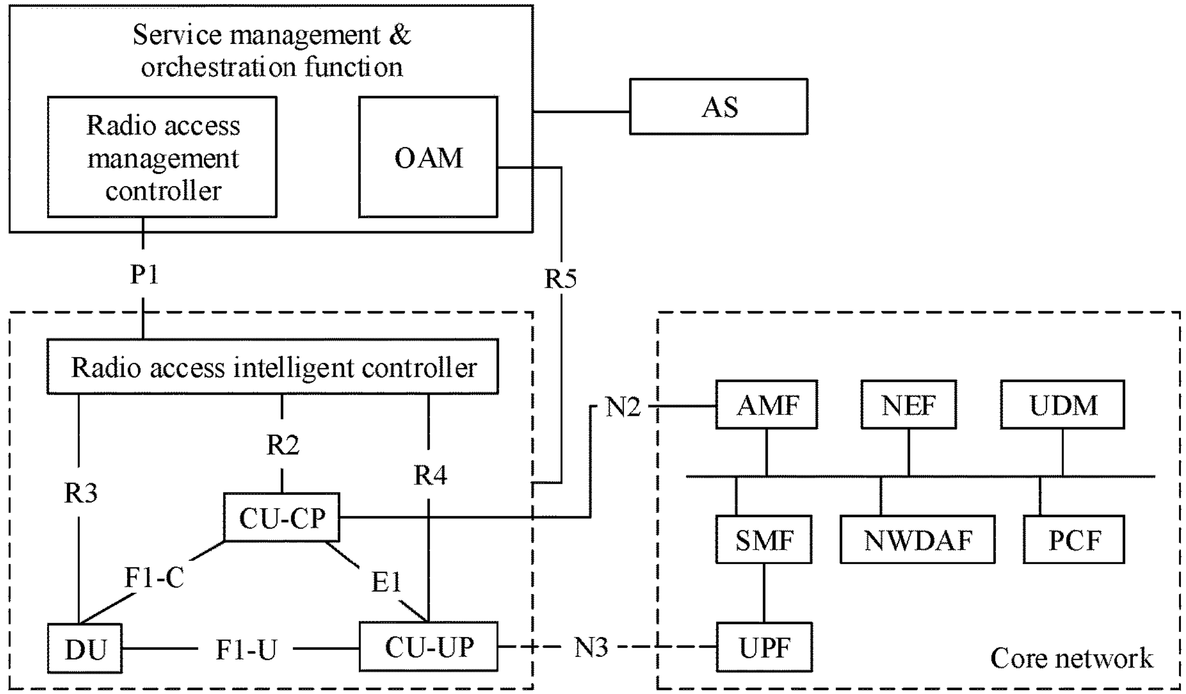
FIG. 2 is a schematic diagram of a communication system architecture according to this application.
Figure 3:
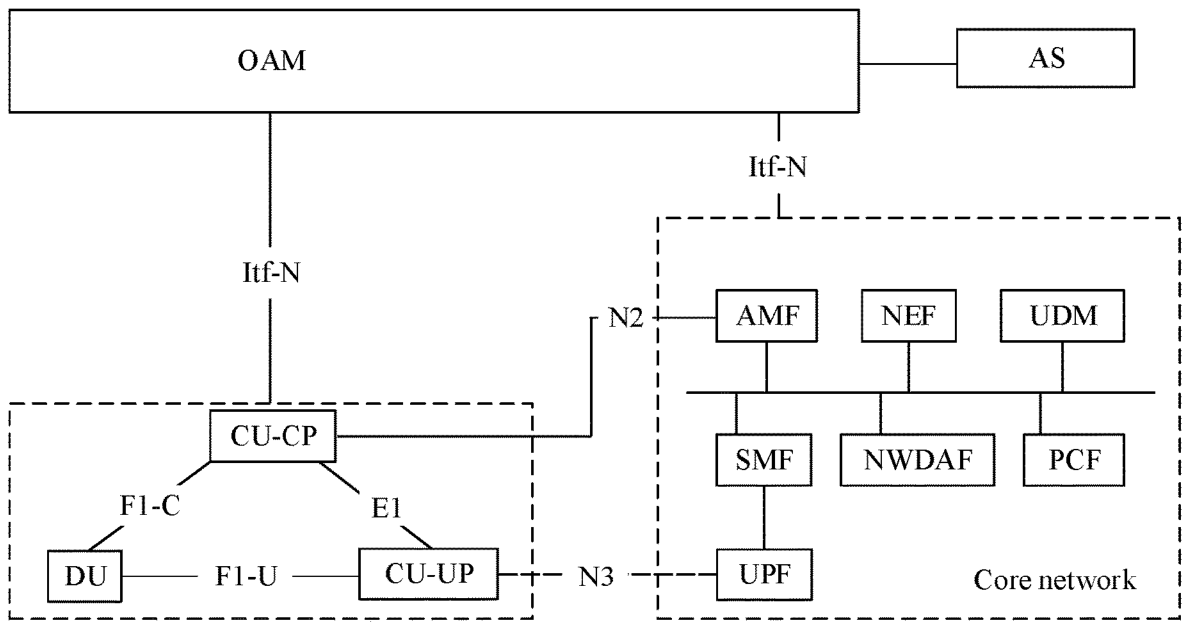
FIG. 3 is a schematic diagram of another communication system architecture according to this application.

First, FIG. 2 and FIG. 3 are respectively schematic diagrams of system architectures applicable to the technical solutions of this application. Schematic diagrams of specific structures of the system architectures are shown in FIG. 2 and FIG. 3.

It should be understood that, in a schematic diagram of a system architecture shown in FIG. 2, the system architecture may include a radio access management controller, an OAM network element, an AS, a radio access intelligent controller, a wireless network device, and a related core network element. Connection relationships between components of the system structure are shown in FIG. 2, and details are not described herein again.

It should be understood that, in a schematic diagram of a system architecture shown in FIG. 3, the system architecture may include an OAM network element, an AS, a wireless network device, and a related core network element. Connection relationships between components of the system architecture are shown in FIG. 3, and details are not described herein again.

It should be understood that architectures in FIG. 2 and FIG. 3 are two different management architectures. The architecture in FIG. 2 is the architecture including the radio access management controller and the radio access intelligent controller. The architecture in FIG. 3 is the management architecture defined in a current $3^{rd}$ generation partnership project (3GPP) standard.

In the foregoing schematic diagrams of the two system architectures, a CU-CP and a CU-UP may be separately deployed, or may be deployed in a combined (e.g., integrated) manner. If the CU-CP and the CU-UP are deployed in a combined manner, a device obtained after the combination may be collectively referred to as a CU device. The CU-CP, the CU-UP, and a DU can be deployed separately, or can be deployed in a combined manner. If the CU-CP, the CU-UP, and the DU are deployed in a combined manner, a device obtained after combination may be collectively referred to as a gNB device, or a wireless network device.

It should be understood that, in the schematic diagram of the system architecture shown in FIG. 2, the radio access intelligent controller can also be combined with the CU-CP.

The schematic diagrams of the system architectures shown in FIG. 2 and FIG. 3 may both be applied to a current 4G network, a current 5G network, or another future network (e.g., 6G). This is not limited in this application.

In the schematic diagrams of the system architectures respectively shown in FIG. 2 and FIG. 3, a core network includes at least the following several core network elements, and functions of the core network elements are described as follows.

A user plane function (UPF) network element may be understood as a name of the user plane function network element in a 5G architecture.

The user plane function network element may include one or more of the following functions related to a user plane: data packet routing and transmission, packet detection, service usage reporting, QoS processing, lawful interception, uplink packet detection, downlink data packet storage, and the like.

An access and mobility management function (AMF) network element may be understood as a name of a mobility management network element in the 5G architecture.

The access and mobility management function network element may include one or more of the following functions related to access and mobility: connection management, mobility management, registration management, access authentication and authorization, reachability management, security context management, and the like.

A session management function (SMF) network element may be understood as a name of the session management function network element in the 5G architecture.

The session management network element may include one or more of the following functions: session management, execution of a control policy delivered by a PCF, UPF selection, UE internet protocol (IP) address allocation, and the like.

A policy control function (PCF) network element may be understood as a name of the policy control function network element in the 5G architecture.

The policy control function network element may include one or more of the following functions: session-level and service flow-level charging policy control, QoS policy control, or UE policy decision.

Optionally, in the system, a PCF connected to the AMF may be a PCF for access and mobility control (AM PCF), and a PCF connected to the SMF may be a PCF for session management (SM PCF).

For example, in actual deployment, the AM PCF and the SM PCF may be deployed in a same PCF entity, or may be deployed in different PCF entities.

A unified data management (UDM) network element may be understood as a name of the unified data management network element in the 5G architecture.

The unified data management network element may include one or more of the following functions: unified data management, support for authentication credential processing in a 3GPP authentication and key agreement mechanism, user identity processing, access authorization, registration and mobility management, subscription management, short message service (SMS) message management, or the like.

A network exposure function (NEF) network element may be understood as a name of the network exposure function network element in the 5G architecture.

The network exposure function network element may include one or more of the following functions: supporting capability or event exposure, for example, securely exposing, to the outside, a service, a capability, and the like that are provided by a 3GPP network function.

A network data analysis function (NWDAF) network element may be understood as a name of the network data analysis function network element in the 5G architecture.

The network data analysis function network element may include one or more of the following functions: performing a core network data analysis function based on an ML model.

An AS may be understood as a functional entity outside the 3GPP network, for example, a third-party application service, an operator, or a third-party service provider.

It should be understood that, in the schematic diagram of the system architecture shown in FIG. 2, a P1 interface can be used to transmit control information and an optimization policy or perform information reporting between the radio access management controller and the radio access intelligent controller.

An F1-C interface can be used to transmit control information between the CU-CP and the DU.

An F1-U interface can be used to transmit user data between the CU-UP and the DU.

An E1 interface can be used to transmit control information between the CU-CP and the CU-UP.

An R5 interface can be used to transmit network element management information between the OAM network element and the wireless network device (including the CU-CP, the CU-UP, and the DU).

An N2 interface can be used to transmit control information between a core network control network element AMF and a control network element (such as the CU-CP or the gNB) of the wireless network.

An N3 interface can be used to transmit user data between a core network user plane network element UPF and a user plane network element (such as the CU-UP or the gNB) of the wireless network.

It should be understood that, in the schematic diagram of the system architecture shown in FIG. 3, an Itf-N interface can be used to transmit network management information between a network management system and an element management system.

The following further describes a communication method provided in this application with reference to FIG. 4 to FIG. 7.

Figure 4:
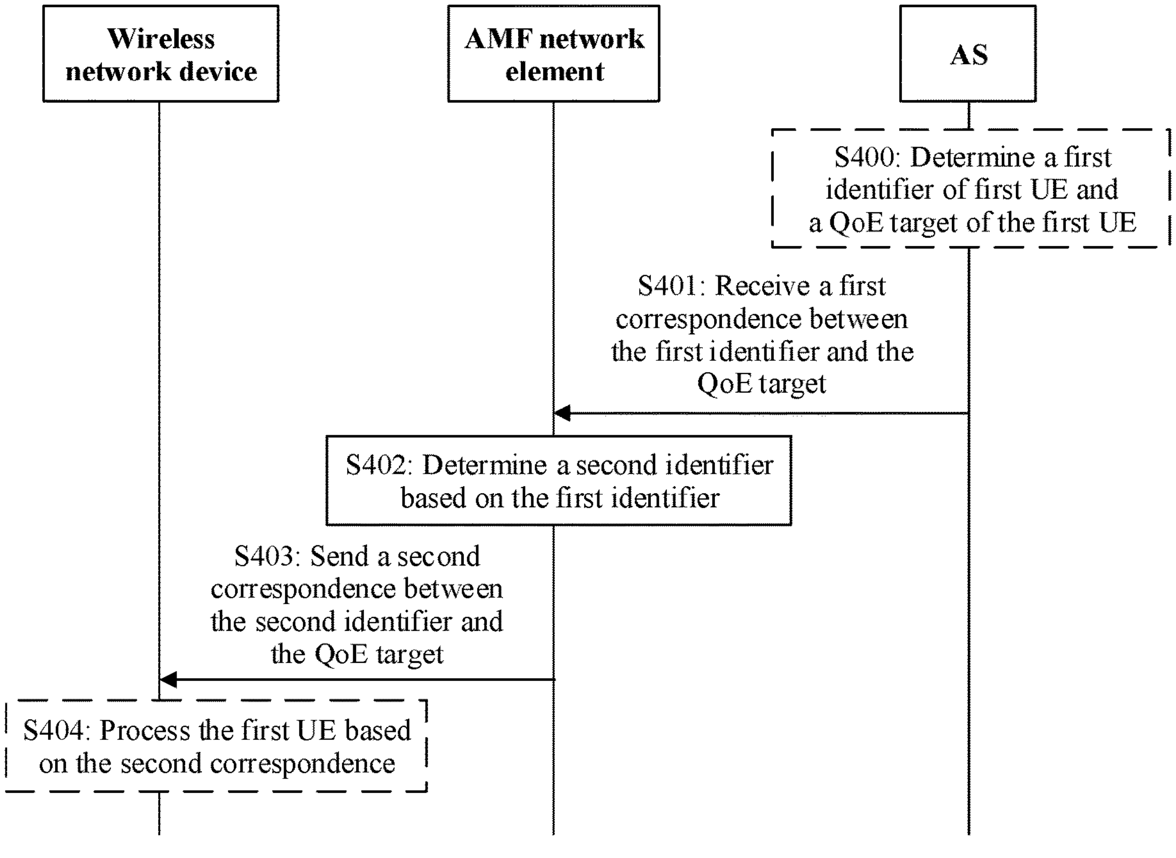
FIG. 4 is a schematic flowchart of a communication method according to this application.

This application provides a communication method. The communication method is applicable to the two system architectures shown in FIG. 2 and FIG. 3. An example implementation of the method is shown in FIG. 4.

S400: An AS determines a first identifier and a QoE target of first UE.

It should be understood that the AS not only can determine the first identifier and the QoE target of the first UE, but also can determine a first correspondence between the first identifier and the QoE target of the first UE. This is not limited in this application.

It should be understood that, as a third-party application service, an operator, or a third-party service provider, the AS needs to determine to provide specified service level agreement (SLA) assurance for specified first UE, and determine a QoE target corresponding to the first UE for which the specified SLA assurance needs to be provided.

Specifically, the AS can determine, based on a service requirement of the AS, that the specified SLA assurance needs to be provided for the specified first UE, and determine a QoE target corresponding to the specified first UE.

Optionally, the AS can send the first identifier and the QoE target of the first UE to an NEF network element.

Specifically, the AS may send the first identifier and the QoE target of the first UE to the NEF network element by invoking a service interface of the NEF network element (for example, an Nnef_Event Exposure service-based interface).

It should be understood that the AS can also send the first correspondence between the first identifier and the QoE target of the first UE to the NEF network element.

Correspondingly, the NEF network element receives the first identifier and the QoE target of the first UE from the AS, or receives the first correspondence between the first identifier and the QoE target of the first UE. This is not limited in this application.

It should be understood that, when the NEF receives the first identifier and the QoE target of the first UE from the AS, the NEF can also establish the first correspondence between the first identifier and the QoE target of the first UE.

It should be understood that the first correspondence may include the first identifier of the first UE.

Optionally, the first correspondence may further include the QoE target of the first UE.

Specifically, the first correspondence may be presented in a form of an array. For example, the array may include two elements. One is the first identifier of the first UE, and the other is the QoE target of the first UE. By combining the two elements into a same array, the AS or the NEF network element establishes the first correspondence between the first identifier of the first UE and the QoE target of the first UE. In addition, the first correspondence may also mean the first identifier and the QoE target of the first UE, or may be presented in another form. This is not limited in this application.

It should be understood that the NEF network element can further invoke, based on a service-based interface in a core network element, a service provided by an AMF network element to send the first correspondence between the first identifier and the QoE target of the first UE to the AMF network element.

It should be understood that the service that is provided by the AMF network element and that is invoked by the NEF network element may be of a newly defined service type. For example, the service may be Namf_Parameter Provision_Create, and may be understood as a configuration parameter creation service, or may be of another service type defined by another AMF network element. This is not limited in this application.

It should be understood that step S400 is an optional step.

S401: The AMF network element receives the first correspondence between the first identifier and the QoE target.

Specifically, the AMF may receive the first correspondence between the first identifier and the QoE target of the first UE from the AS, or may receive the first correspondence between the first identifier and the QoE target of the first UE from the NEF network element. This is not limited in this application.

It should be understood that the AS may send the first identifier and the QoE target of the first UE to the NEF network element by invoking the service interface of the NEF network element (for example, the Nnef_Event Exposure service-based interface).

It should be understood that the first identifier indicates an identifier of the first UE at an application layer, and the QoE target indicates or is used to measure a service quality of experience target of the first UE.

For example, the first identifier may be a generic public subscription identifier (GPSI). A value of the first identifier may be an IP quintuplet and a mobile subscriber ISDN number (MSISDN) of the UE. The ISDN is an identifier of an integrated service digital network (ISDN), an international mobile equipment identity (IMEI), or another application layer.

It should be understood that the QoE target of the first UE can indicate or be used to measure the service quality of experience target of the first UE.

For example, a mean opinion score (MOS) of a service experience score of the first UE needs to be greater than 4, a service data throughput of the first UE achieves a specific value, or the like.

It should be noted that, in this application, the QoE target of the first UE may mean that the service data throughput of the first UE needs to achieve a specific value (e.g., predetermined value). A specific form of the QoE target of the first UE is not limited in this application.

S402: The AMF network element determines a second identifier based on the first identifier.

It should be understood that the AMF network element may determine the second identifier of the first UE based on the first identifier of the first UE.

For example, the AMF network element determines an identity of the first UE based on the first identifier of the first UE, and the AMF network element determines the second identifier of the first UE based on the identity of the first UE.

As an example description, after receiving the first correspondence between the first identifier and the QoE target of the first UE, the AMF network element can query, based on the first identifier of the first UE included in the first correspondence, an identity corresponding to the first identifier, for example, an international mobile subscriber identity (IMSI), determines the second identifier of the first UE based on the identity corresponding to the first identifier, and associates the first identifier, the identity corresponding to the first identifier, and the second identifier. For example, the AMF network element establishes a table that can simultaneously store these related identifiers of the first UE.

More specifically, after determining the second identifier of the first UE, the AMF network element associates the second identifier of the first UE with the QoE target of the first UE, that is, establishes a second correspondence between the second identifier of the first UE and the QoE target of the first UE. The second correspondence may be presented in a form of an array. For example, the second correspondence may include the second identifier of the first UE, and may also include the QoE target of the first UE. The second correspondence may also mean the second identifier and the QoE target, or may alternatively be presented in another form. This is not limited in this application.

Specifically, in this application, the first identifier and the second identifier of the first UE may be associated by using the first correspondence between the first identifier of the first UE and the QoE target of the first UE and the second correspondence between the second identifier of the first UE and the QoE target of the first UE.

According to step S402, the AMF network element can complete identity verification of the first UE, can obtain the second identifier of the first UE, and may further establish a correspondence between the first identifier and the second identifier of the first UE.

S403: The AMF network element sends the second correspondence between the second identifier and the QoE target.

Specifically, the AMF network element sends the second correspondence between the second identifier and the QoE target of the first UE to a wireless network device.

Specifically, the AMF network element may send, by using an N2 interface signaling message between the AMF network element and the wireless network device, the second correspondence between the second identifier and the QoE target of the first UE to a wireless network device serving the first UE.

It should be understood that the N2 interface signaling message used in step S403 may be an existing UE information transfer message, or may be another newly defined message. This is not limited in this application.

It should be understood that on the basis that location information of the first UE identified by the first identifier is locally stored, the AMF network element can determine, based on the location information, the wireless network device serving the first UE, and deploy, by using the N2 interface signaling message between the AMF network element and the wireless network device, an SLA assurance policy for the wireless network device serving the first UE, that is, send the second correspondence between the second identifier and the QoE target of the first UE to the wireless network device. The second correspondence may include the second identifier and the target QoE of the first UE.

Correspondingly, the wireless network device receives the second correspondence between the second identifier and the QoE target of the first UE from the AMF network element.

Optionally, in step S404, the wireless network device processes the first UE based on the second correspondence.

Specifically, the wireless network device can analyze performance quality of the first UE based on locally collected data of the first UE.

For example, the wireless network device can calculate QoE of the first UE based on the data of the first UE, and compare the QoE of the first UE with the QoE target of the first UE.

When the wireless network device determines that the QoE of the first UE does not achieve, or does not meet, or is less than the QoE target of the first UE, the wireless network device determines, based on a locally configured optimization policy, to process the first UE. Through the processing, in this application, the QoE of the first UE can achieve or surpass the QoE target of the first UE.

For example, after receiving the second correspondence sent by the AMF network element, the wireless network device triggers a performance evaluation or a measurement on the first UE, and compares the QoE of the first UE with the QoE target and performs an analysis.

As an example description, the processing manner may be improving the QoS of the first UE, handing over the first UE to a cell that can meet the QoE target of the first UE, reallocating more resources to the first UE, or the like.

It should be understood that, in the foregoing technical solution, the QoE target of the first UE can be used to determine an optimization policy of the first UE, and the optimization policy is used to enable the QoE of the first UE to reach the QoE target of the first UE.

It should be understood that the wireless network device may further trigger, based on an optimization operation instruction or the optimization policy, signaling interaction with another network element (for example, a core network) or the first UE. If the QoS is modified, the wireless network device needs to interact with the core network and the first UE. However, for a related procedure, there is a related definition in a current 3GPP standard specification (for example, TS23.502 or TS38.300). Therefore, for content of this part, refer to a related procedure in the 3GPP standard specification. Details are not described herein again in this application.

According to the foregoing method, in this application, a requirement for service QoE of the specified first UE may be met from a network layer rather than a management plane by using direct signaling interaction between core network elements.

Figure 5:
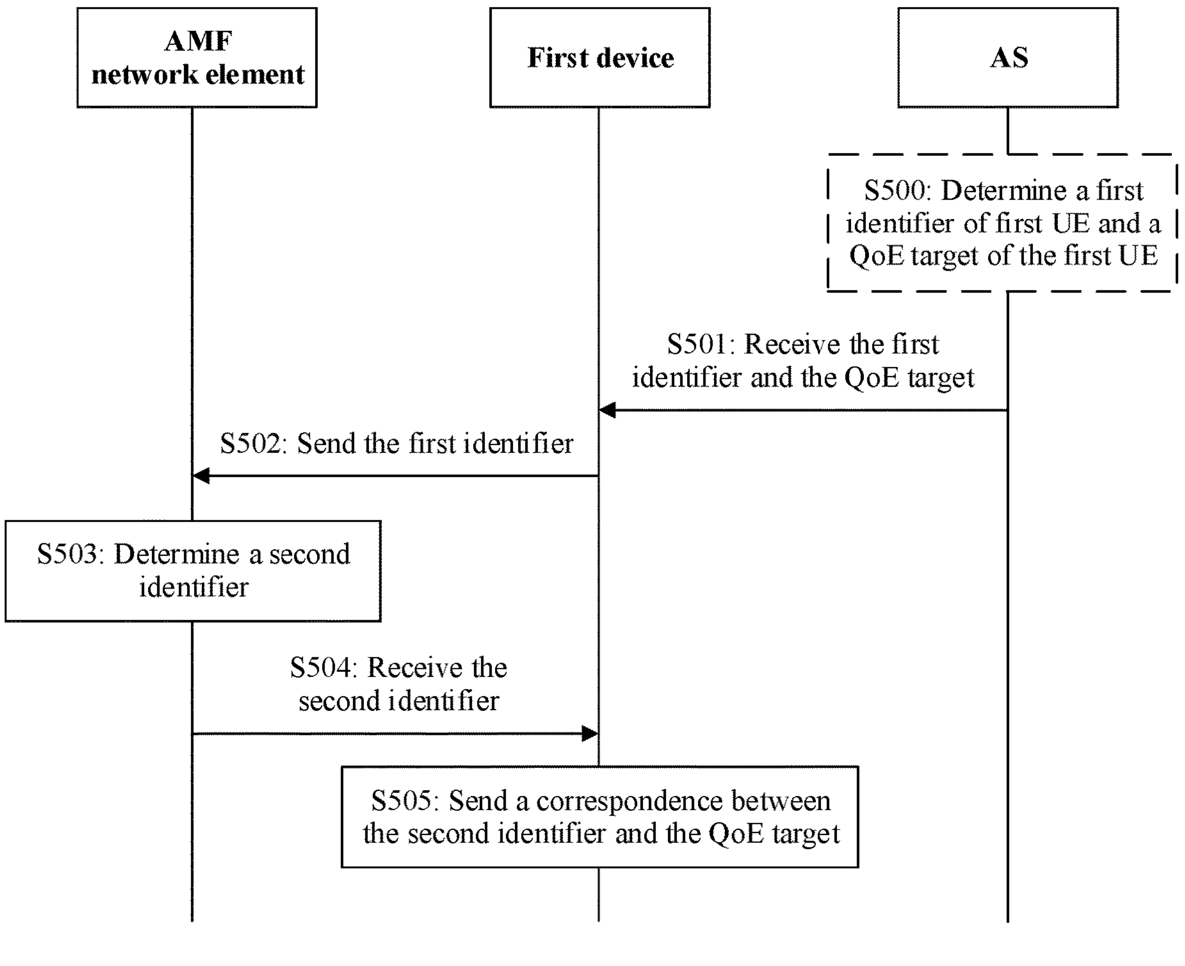
FIG. 5 is a schematic flowchart of another communication method according to this application.

FIG. 5 shows another communication method according to this application. The method can be applicable to the system architectures shown in FIG. 2 and FIG. 3. An example of an implementation of the method is shown in FIG. 5.

S500: An AS determines a first identifier of first UE and a QoE target of the first UE. As a third-party application service, an operator, or a third-party service provider, the AS needs to determine whether to provide specified SLA assurance for specified first UE, and determine a QoE target corresponding to the first UE for which the specified SLA assurance needs to be provided.

Specifically, the AS can determine, based on a service requirement of the AS, that the specified SLA assurance needs to be provided for the specified first UE, and determine the QoE target corresponding to the specified first UE.

It should be understood that the first identifier of the first UE can indicate an identifier of the first UE at an application layer, and the first identifier can identify the first UE for which the SLA assurance needs to be provided.

For example, the first identifier may be a generic public subscription identifier (GPSI). A value of the first identifier may be an IP quintuplet and a mobile station international ISDN number (MSISDN) of the UE. The ISDN is an identifier of an integrated service digital network (ISDN), an IMEI, or another application layer.

By determining the first identifier of the first UE, the AS and the radio access management controller, the radio access intelligent controller, the another network element, and the like in the two system architectures shown in FIG. 2 and FIG. 3 can learn of the identifier of the first UE at the application layer, and then can identify the first UE.

It should be understood that the QoE target of the first UE can indicate or be used to measure a service quality of experience target of the first UE.

For example, a mean opinion score (MOS) of a service experience score of a first terminal device needs to be greater than 4, or a service data throughput of the first UE reaches a specific value.

It should be noted that, in this application, the QoE target of the first UE may mean that the service data throughput of the first UE needs to reach a specific value (e.g., predetermined value). A specific form of the QoE target of the first UE is not limited in this application.

It should be understood that step S500 is an optional step.

S501: A first device receives the first identifier and the QoE target from the AS.

Specifically, the AS sends the first identifier and the QoE target of the first UE to the first device by using first information.

It should be understood that the first information is used to transmit enrichment information (EI). The enrichment information may be a service requirement (such as a rate and bandwidth), the QoE target, or the like.

Currently, a message for sending the enrichment information by an application server to a network is not defined in the industry. Therefore, in this application, the first information represents a name of a message used to transmit the enrichment information, or the message name may be an enrichment information provide (e.g., EI provide) message or another message name. This is not limited in this application.

Optionally, the first device may further receive location information of the first UE from the AS.

Specifically, when the first device is an OAM network element, the location information of the first UE can be used by the OAM network element to query a core network element serving the first UE. When the first device is the radio access management controller, the radio access management controller can query, based on the location information of the first UE, a radio access intelligent controller serving the first UE, and the radio access intelligent controller can query, based on the location information of the first UE, a wireless network device serving the first UE, for example, a gNB, a CU-CP, a CU-UP, and a DU.

It should be understood that the location information of the first UE may be a tracking area (TA), a cell identifier (Cell Id), or a physical location of the first UE (to be specific, the physical location of the first UE describes a geographical location of the first UE).

It should be understood that when the location information of the first UE is the physical location, the OAM network element needs to convert the physical location to corresponding network location information, for example, the TA or the Cell Id.

It should be understood that when the AS does not send the location information of the first UE to the radio access management controller, the OAM network element cannot determine the core network element serving the first UE, and the OAM network element sends the first identifier of the first UE and the QoE target of the first UE to all core network elements located in a coverage area of the OAM network element, for example, an AMF network element, an NEF network element, or an NWADF network element.

The radio access management controller may determine, based on the location information of the first UE, the radio access intelligent controller serving the first UE more quickly. The radio access management controller can also query, based on a location of the first UE, the radio access intelligent controller serving the first UE. The radio access intelligent controller queries, based on the location of the first UE, a wireless network device serving the first UE, so that management efficiency of an entire communication system can be improved.

S502: The first device sends the first identifier to the AMF network element.

Correspondingly, the AMF network element receives the first identifier of the first UE from the first device.

It should be understood that the first device sends the first identifier of the first UE to the AMF network element based on a management service (MnS) provided by a management interface.

It should be understood that the first identifier of the first UE sent by the first device to the AMF network element is used to request to obtain a second identifier of the first UE. Request information may be sent to a first AMF network element by using the first device, where the request information is used to request to obtain the second identifier of the first UE. Alternatively, the first identifier of the first UE may directly be sent to the AMF network element by using the first device. It may be understood that content sent by the first device has a function of the foregoing request information. Alternatively, a specific protocol may be established between the first device and the AMF network element. To be specific, when the first device sends the first identifier of the first UE to the AMF network element, the AMF network element can determine and feedback the second identifier of the first UE based on the information. This is not limited in this application.

It should be understood that the second identifier of the first UE can indicate or identify an identifier of the first UE in a network.

Optionally, the first device may further send second identifier type information to the AMF network element, where the second identifier type information indicates a type of the second identifier of the first UE.

It should be noted that when the first device does not send the second identifier type information to the AMF network element, the AMF network element can send all second identifiers related to the first UE to the first device.

For example, the second identifier type information may be a UE-network identifier type (e.g., UE-NetworkId type), and may indicate the type of the second identifier of the first UE. The type of the second identifier may be a globally unique temporary identifier (GUTI), or may be an identifier of the UE in an NGAP connection (for example, a gNB NGAP UE ID or an AMF NGAP UE ID). The NGAP is a next generation application protocol (NGAP). This is not limited in this application.

As an example description, when UE-NetworkId type="GUTI", it indicates that the first device expects to obtain the second identifier corresponding to the first identifier of the first UE, namely, a network identifier GUTI allocated by the network.

The AMF network element can determine, based on the second identifier type information, a specific type of the second identifier of the first UE that the first device needs to obtain, so that the AMF network element can correctly send the second identifier of the first UE to the first device.

Optionally, the first device may send location request information to the AMF network element. The location request information is used to request obtaining the location information of the first UE. In other words, it indicates that the AMF network element needs to feed back the location information of the first UE to the first device.

Based on the foregoing location request information, the AMF network element needs to feed back the location information of the first UE to the first device, so that a component in the system architecture can determine, based on the location information of the first UE, another component serving the first UE. For example, when the first device is the radio access management controller, the first device can determine, based on the location information of the first UE, the radio access intelligent controller serving the first UE, and so on.

It should be understood that there is no direct interface interconnection between the first device and the core network element. Therefore, information interaction between the first device and the core network element is implemented through a management interface provided by the OAM network element.

As an example description, in this application, a new management interface service, for example, a UE information exposure service, may be added, so that the first device obtains the second identifier of the first UE from the core network element.

As another example description, in this application, a performance data management service may also be enhanced, so that the radio access management controller obtains the second identifier of the first UE from the core network element.

Specifically, in this application, the UE-NetworkId type added to measurement category parameters of a measurement job creation request (e.g., create measurement job request) in the performance data management service may be enhanced, and the second identifier of the first UE is returned to the first device in a measurement job creation response (e.g., create measurement job response) or file-based data transmission.

As still another example description, in this application, a minimization of drive tests (MDT) activation procedure may be further enhanced, so that the first device obtains the second identifier of the first UE from the core network element.

Specifically, in this application, a UE-NetworkId type parameter added to an MDT activation request may be enhanced, and the second identifier of the first UE is returned to the radio access management controller in an MDT activation response message.

It should be understood that the first device may obtain the second identifier of the first UE from the AMF network element by using the methods described in the foregoing three example descriptions or by using another manner. This is not limited in this application.

Optionally, the first device may further send the first identifier of the first UE to the NEF network element or the NWADF network element.

Specifically, because the NEF network element or the NWADF network element does not store identity information of the first UE, after receiving the first identifier of the first UE, the NEF network element or the NWADF network element requests, through a service-based interface between core network elements, the AMF network element to verify the identity of the first UE, and obtains the second identifier of the first UE from the AMF network element.

After completing identity verification processing on the first UE, the AMF network element returns the second identifier of the first UE to the NEF network element or the NWADF network element.

Correspondingly, the NEF network element or the NWADF network element feeds back the second identifier of the first UE obtained from the AMF network element to the first device.

S503: The AMF network element determines the second identifier.

Specifically, the AMF network element determines the second identifier of the first UE based on the first identifier of the first UE.

For example, the AMF network element determines the identity of the first UE based on the first identifier of the first UE, and the AMF network element determines the second identifier of the first UE based on the identity of the first UE.

As an example description, after receiving the first identifier of the first UE, the AMF network element queries, based on the first identifier of the first UE, an identity corresponding to the first identifier, for example, an IMSI, determines the second identifier of the first UE based on the identity corresponding to the first identifier, and then associates the first identifier, the identity corresponding to the first identifier, and the second identifier. For example, the AMF network element establishes a table that can simultaneously store these related identifiers of the first UE, and feeds back the table to the first device.

S504: The first device receives the second identifier from the AMF network element.

Optionally, the AMF network element further sends the first identifier of the first UE to the first device.

It should be understood that when the first device sends location request information to the AMF network element, the location request information is used to request the location information of the first UE.

Correspondingly, the information sent by the AMF network element to the first device may further include the location information of the first UE.

It should be understood that the location information of the first UE included in the information sent by the AMF network element to the first device may be a cell Id, or may be identification information that can identify a location of the first UE, such as a TA identifier.

It should be understood that information sent by the first device to the AMF network element and the information fed back by the AMF network element to the first device correspond to each other.

For example, if the information sent by the first device to the AMF network element is newly added UE information exposure information, the information fed back by the AMF network element to the radio access management controller is UE information exposure acknowledgment information.

For example, if the information sent by the first device to the AMF network element is create measurement job request information, the information fed back by the AMF network element to the radio access management controller is measurement job creation response (e.g., create measurement job response) information.

For example, if the information sent by the first device to the AMF network element is MDT activation request information, the information fed back by the AMF network element to the radio access management controller is MDT activation response information.

It should be understood that the several information forms that are listed in the foregoing example description and that are sent by the first device to the AMF network element all include the first identifier of the first terminal device.

Correspondingly, several information forms fed back by the AMF network element to the first device also include the second identifier of the first UE and the first identifier of the first UE.

S505: The first device sends a correspondence between the second identifier and the QoE target.

Specifically, the first device may establish a correspondence between the second identifier of the first UE and the QoE target of the first UE. The correspondence may be presented in a form of an array. For example, the correspondence may include the second identifier of the first UE, or may include the QoE target of the first UE. The correspondence may alternatively be presented in another form. This is not limited in this application.

Optionally, the first device further sends the location information of the first UE.

According to the foregoing technical solution, in this application, the first device can request, based on the first identifier of the first UE input by the AS, the core network element to verify the first UE, and obtain the second identifier of the first UE, to identify the specified first UE by using the obtained second identifier when an SLA assurance policy for the first UE is delivered. In this way, not only is the privacy security for the first UE is protected, but also the wireless network device can correctly identify the specified first UE for which the SLA assurance needs to be provided, and the radio access intelligent controller can dynamically and timely implement the SLA assurance for the specified first UE based on a real-time status of a wireless network.

Figure 6:
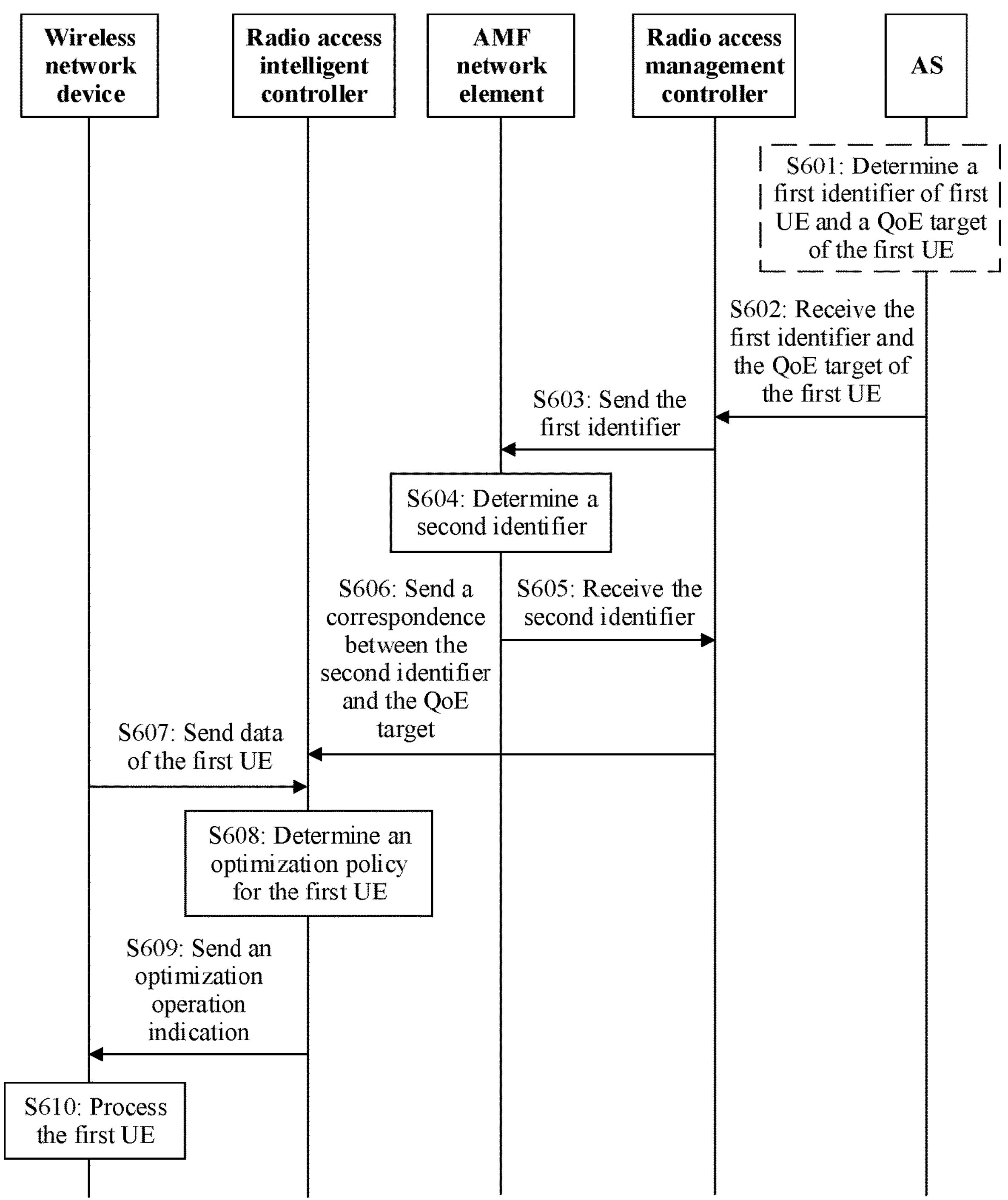
FIG. 6 is a schematic flowchart of still another communication method according to this application.

The following further describes the method shown in FIG. 5 with reference to FIG. 6.

It should be understood that the technical solution shown in FIG. 6 is applicable to a case in which a first device is a radio access management controller, and the technical solution is applicable to the system architecture shown in FIG. 2. Details are shown in FIG. 6.

S601: An AS determines a first identifier of first UE and a QoE target of the first UE. For a specific description, refer to the foregoing description about S500, and details are not described herein again.

S602: The radio access management controller receives the first identifier and the QoE target from the AS. For a specific description, refer to the foregoing description about S501, and details are not described herein again.

S603: The radio access management controller sends the first identifier to an AMF network element. For a specific description, refer to the foregoing description about S502, and details are not described herein again.

S604: The AMF network element determines a second identifier. For a specific description, refer to the foregoing description about S503, and details are not described herein again.

S605: The radio access management controller receives the second identifier from the AMF network element. For a specific description, refer to the foregoing description about S504, and details are not described herein again.

S606: The radio access management controller sends a correspondence between the second identifier and the QoE target of the first UE to a radio access intelligent controller.

Specifically, the radio access management controller may establish the correspondence between the second identifier of the first UE and the QoE target of the first UE. The correspondence may be presented in a form of an array. For example, the correspondence may include the second identifier of the first UE, or may include the QoE target of the first UE. The correspondence may alternatively be presented in another form. This is not limited in this application.

Optionally, the radio access management controller may further send location information of the first UE to the radio access intelligent controller.

Specifically, the radio access management controller can determine, based on the location information of the first UE, the radio access intelligent controller serving the first UE, and send, through the P1 interface shown in FIG. 1, the correspondence between the second identifier and the QoE target of the first UE to the radio access intelligent controller serving the first UE.

Optionally, the radio access management controller may further send the first identifier of the first UE to the radio access intelligent controller.

It should be noted that the location information of the first UE sent by the radio access management controller to the radio access intelligent controller may be the location information of the first UE directly sent by the AS, or may be the location information of the first UE fed back by the AMF network element.

It should be understood that information about the P1 interface may be policy creation (e.g., create policy) information, or may be information of another type, for example, an intent-based interface (for example, creation intent). This is not limited in this application.

S607: The radio access intelligent controller receives data of the first UE from a wireless network device.

In this step, the radio access intelligent controller can determine, based on the location information of the first UE, the wireless network device serving the first UE, and receive data and a radio network temporary identifier of the first UE through an interface between the radio access intelligent controller and the wireless network device.

For example, the data of the first UE may be radio signal quality of the first UE, an uplink/downlink rate of the first UE, an uplink/downlink throughput rate of the first UE, or the like.

When the radio access intelligent controller sends a request for collecting performance data of the first UE to the wireless network device, the request carries the second identifier of the first UE. The wireless network device determines the first UE by using the second identifier of the first UE, and collects the data about the first UE.

It should be noted that, the data sent by the wireless network device to the radio access intelligent controller further carries the radio network temporary identifier (RNTI) of the first UE. As a temporary identifier allocated to the first UE in the wireless network device, the radio network temporary identifier is used to identify the performance data of the first UE, and may be a random access radio network temporary identifier (RA-RNTI), or a temporary cell radio network identifier (TC-RNTI), or a cell radio network identifier (e.g., cell access RNTI, CA-RNTI). This is not limited in this application.

S608: The radio access intelligent controller determines an optimization policy for the first UE.

Specifically, the radio access intelligent controller associates the foregoing received second identifier of the first UE with the RNTI of the first UE. For example, the radio access intelligent controller establishes a table that may simultaneously store related identifiers of the first UE.

It should be understood that the radio access intelligent controller can analyze performance quality of the first UE based on the data of the first UE. For example, the radio access intelligent controller calculates QoE of the first UE based on the data of the first UE, and compares the QoE with the QoE target of the first UE. If the QoE of the first UE does not reach the QoE target of the first UE, the radio access intelligent controller determines, based on a locally configured optimization policy, to perform optimization processing on the first UE.

For example, the optimization policy may be to improve QoS of the first UE, or may be to hand over the first UE to another cell that meets the QoE target, or may be reallocating more resources to the first UE, or may be selecting a target base station when the QoE of the first UE does not meet the QoE target, establishing dual connectivity for the first UE, and performing user data transmission for the first UE by using the target base station, or the like, to enable the QoE of the first UE to reach or meet the QoE target of the first UE.

S609: The radio access intelligent controller sends an optimization operation indication to the wireless network device.

Correspondingly, the wireless network device receives the optimization operation indication from the radio access intelligent controller.

It should be understood that the radio access intelligent controller can determine, based on a decision conclusion in step S608, to perform optimization processing on the first UE, and may send the optimization operation indication to the wireless network device by using interface information (for example, policy control information) between the radio access intelligent controller and the wireless network device. The operation indication carries the second identifier of the first UE and an optimization operation instruction (for example, improving the QoS of the first UE, handing over the cell, establishing the dual connectivity for the first UE, and preempting a resource of low-priority UE).

It should be understood that the optimization operation indication can further carry the RNTI of the first UE.

S610: The wireless network device processes the first UE.

After receiving the optimization processing indication from the radio access intelligent controller, the wireless network device performs optimization processing on the first UE.

As an example description, if the optimization operation indication is improving the QoS of the first UE, the wireless network device adjusts radio resource configuration based on a QoS parameter in step S509. If the optimization operation indication is handing over the cell, the wireless network device performs handover processing on the first UE according to an indication in step S509.

It should be understood that the wireless network device may further trigger, based on the optimization operation instruction or the optimization policy, signaling interaction with another network element (for example, a core network) or the first UE. If the QoS is modified, the wireless network device needs to interact with the core network and the first UE. However, for a related procedure, there is a related definition in a current 3GPP standard specification (for example, TS23.502 or TS38.300). Therefore, for content of this part, refer to a related procedure in the 3GPP standard specification. Details are not described herein again in this application.

According to the foregoing technical solution, in this application, the radio access management controller can request, based on the first identifier of the first UE input by the AS, a core network element to verify the first UE, and obtain the second identifier of the first UE, to identify the specified first UE by using the obtained second identifier when an SLA assurance policy for the first UE is delivered. In this way, not only is the privacy security of the first UE protected, but also the wireless network device can correctly identify the specified first UE for which SLA assurance needs to be provided, and the radio access intelligent controller can dynamically and timely implement the SLA assurance for the specified first UE based on a real-time status of a wireless network.

Figure 7:
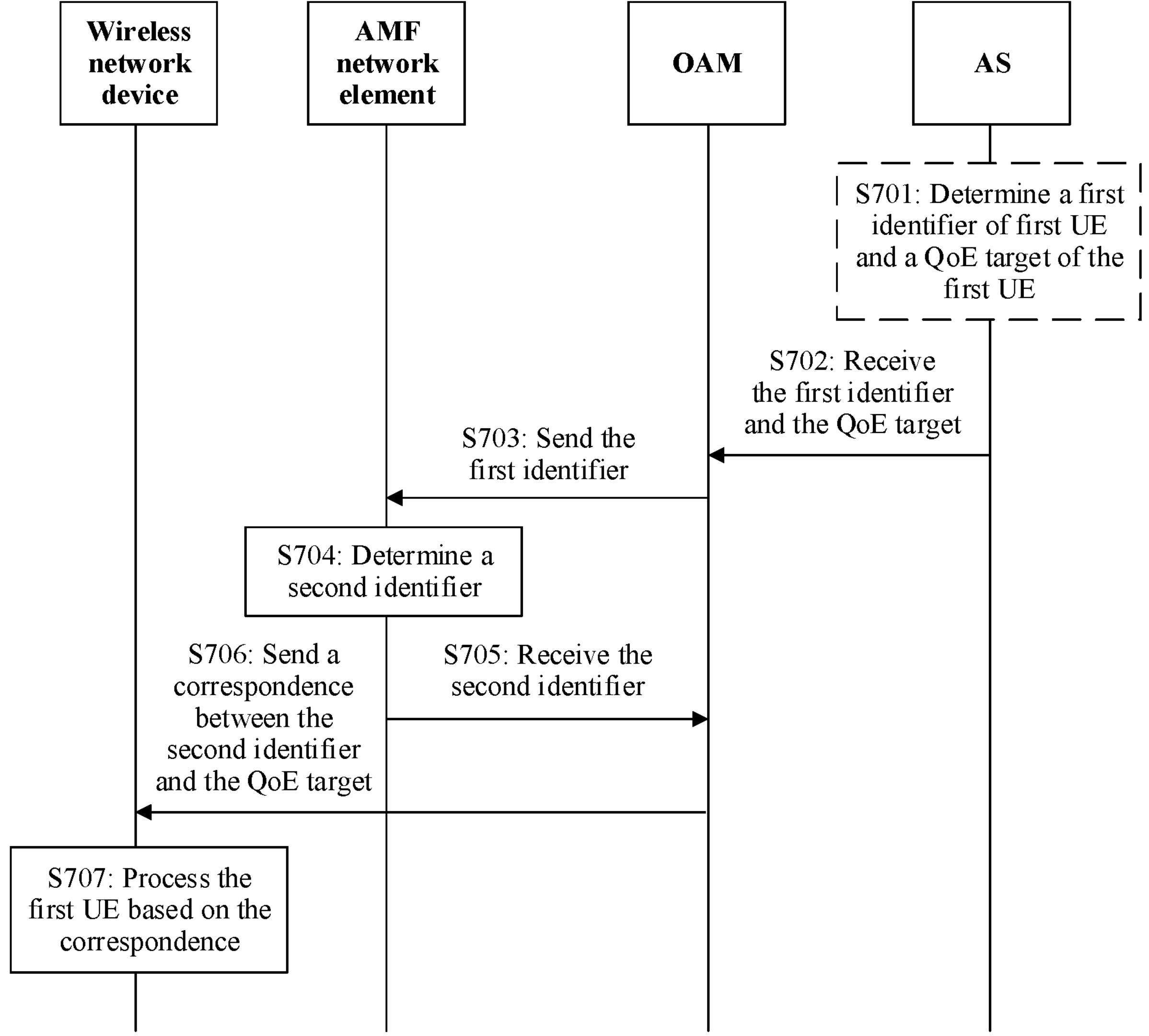
FIG. 7 is a schematic flowchart of yet another communication method according to this application.

The following further describes the method shown in FIG. 5 with reference to FIG. 7. The technical solution in FIG. 7 is applicable to a case in which a first device is an OAM network element, and the technical solution is applicable to the system architecture shown in FIG. 3. A specific method procedure is shown in FIG. 7.

S701 is the same as step S500, and details are not described herein again.

S702: The OAM network element receives a first identifier and a QoE target from an AS. For a specific description, refer to the foregoing description about S501, and details are not described herein again.

S703: The OAM network element sends the first identifier to an AMF network element. For a specific description, refer to the foregoing description about S502, and details are not described herein again.

S704: The AMF network element determines a second identifier. For a specific description, refer to the foregoing description about S503, and details are not described herein again.

S705: The OAM network element receives the second identifier from the AMF network element. For a specific description, refer to the foregoing description about S504, and details are not described herein again.

S706: The OAM network element sends a correspondence between the second identifier and the QoE target to a wireless network device. For a specific description, refer to the foregoing description about S505, and details are not described herein again.

S707: The wireless network device processes the first UE based on the correspondence. For a specific description, refer to the foregoing description about S404, and details are not described herein again.

A management service interface is enhanced, so that, in this application, information about UE can be opened to the OAM network element, the OAM network element configures an SLA optimization policy oriented to specified first UE for the wireless network device, the wireless network device executes the SLA optimization policy for the specified first UE, and the wireless network device can perform a performance analysis and a policy decision on the first UE and associate the first identifier and the second identifier of the first UE.

Figure 8:
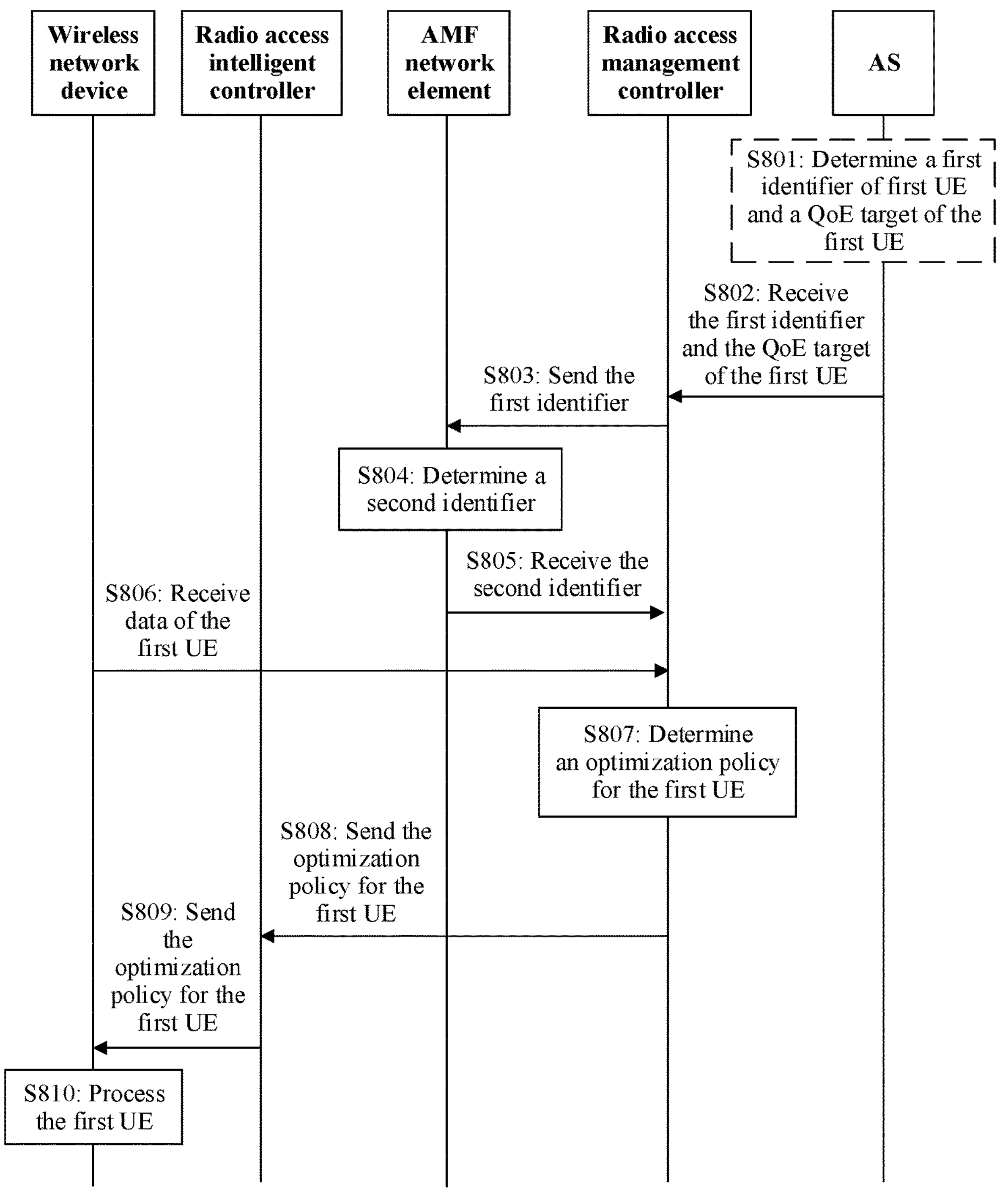
FIG. 8 is a schematic flowchart of still yet another communication method according to this application.

FIG. 8 shows still another communication method according to this application. The method is applicable to the system architecture shown in FIG. 2. An implementation of the method is shown in FIG. 8.

S801 to S805 are the same as the foregoing step S500 to step S504, and details are not described herein again.

S806: A radio access management controller receives data of first UE from a wireless network device.

It should be understood that the radio access management controller may send a second identifier of the first UE through an interface between the radio access management controller and the wireless network device, where the second identifier is used to request data of the first UE, and may receive, through the interface, the data of the first UE sent by the wireless network device.

It should be understood that the data sent by the wireless network device to the radio access management controller through the interface may further carry a RNTI As a temporary identifier allocated to the first UE in the wireless network device, the radio network temporary identifier is used to identify performance data of the first UE, and may be an RA-RNTI, a TC-RNTI, or a CA-RNTI. This is not limited in this application.

For example, the data of the first UE may be radio signal quality of the first UE, an uplink/downlink rate of the first UE, an uplink/downlink throughput rate of the first UE, or the like.

When the radio access management controller sends a request for collecting performance data of the first UE to the wireless network device, the request carries the second identifier of the first UE. The wireless network device determines the first UE by using the second identifier of the first UE, and collects the data about the first UE.

According to the foregoing step S806, on one hand, the radio access management controller determines whether to perform optimization processing on the first UE. On the other hand, the radio access management controller can receive and analyze the performance data of the first UE from the wireless network device, to determine an optimization policy for the first UE, so that service requirement experience of the specified first UE can be ensured, and SLA optimization processing can be provided for the specified first UE.

S807: The radio access management controller determines the optimization policy for the first UE.

Specifically, the radio access management controller associates the foregoing received second identifier of the first UE with the RNTI of the first UE. For example, the radio access management controller establishes a table that may simultaneously store related identifiers of the first UE.

It should be understood that the radio access management controller can analyze performance quality of the first UE based on the data of the first UE. For example, the radio access management controller calculates QoE of the first UE based on the data of the first UE, and compares the QoE with a QoE target of the first UE. If the QoE of the first UE does not reach the QoE target of the first UE, the radio access management controller determines, based on a locally configured optimization policy, to perform optimization processing on the first UE.

For example, the optimization policy may be improving QoS of the first UE, or may be handing over the first UE to another cell that meets the QoE target, or may be reallocating more resources to the first UE, or may be selecting a target base station when the QoE of the first UE does not meet the QoE target, establishing dual connectivity for the first UE, and performing user data transmission for the first UE by using the target base station, or the like, to enable the QoE of the first UE to reach or meet the QoE target of the first UE.

S808: The radio access management controller sends the optimization policy for the first UE to the radio access intelligent controller.

It should be understood that the radio access management controller determines, based on a decision conclusion in step S807, to perform optimization processing on the first UE, that is, the radio access management controller sends the optimization policy for the first UE to the radio access intelligent controller by using P1 interface information between the radio access management controller and the radio access intelligent controller. The optimization policy may carry the second identifier of the first UE and may further carry an optimization operation instruction (for example, improving QoS and handing over the cell).

S809: The radio access intelligent controller sends the optimization policy for the first UE to the wireless network device.

It should be understood that the radio access intelligent controller sends the optimization policy for the first UE to the wireless network device through an interface between the radio access intelligent controller and the wireless network device. The optimization policy may carry the second identifier of the first UE and may further carry the optimization operation instruction (for example, the QoS and the handover).

S810 is similar to the foregoing step S610, and details are not described herein again.

According to the foregoing technical solution, in this application, the radio access management controller can request, based on the first identifier of the first UE input by the AS, a core network element to verify the first UE, and obtain the second identifier of the first UE, to identify specified first UE by using the obtained second identifier when an SLA assurance policy for the first UE is delivered.

In this way, not only is the privacy security of the first UE is protected, the wireless network device can also correctly identify the specified first UE for which SLA assurance needs to be provided, and the radio access intelligent controller can dynamically and timely implement the SLA assurance for the specified first UE based on a real-time status of a wireless network.

Figure 9:
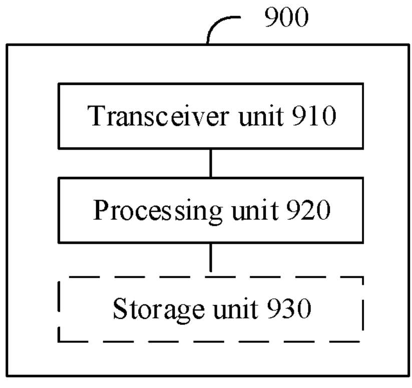
FIG. 9 is a schematic block diagram of a communication apparatus according to this application.
Figure 10:
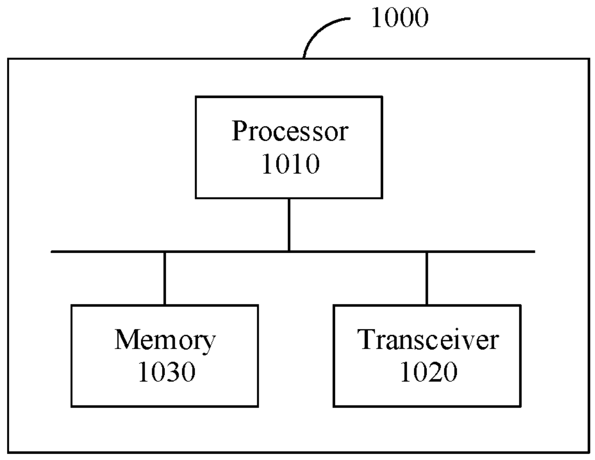
FIG. 10 is a schematic block diagram of another communication apparatus according to this application.

The following describes a communication apparatus provided in this application with reference to FIG. 9 and FIG. 10.

FIG. 9 is a schematic block diagram of a communication apparatus 900 according to this application. As shown in the figure, the communication apparatus 900 may include a transceiver unit 910 (e.g., transceiver circuit) and a processing unit 920 (e.g., processing circuit).

In a possible design, the communication apparatus 900 may be an AMF network element in the foregoing method embodiments, or may be a chip configured to implement a function of the AMF network element in the foregoing method embodiments.

It should be understood that the communication apparatus 900 may correspond to the AMF network element in method embodiments of this application, and the communication apparatus 900 may include units (e.g., circuits) configured to perform methods performed by a first network element in the foregoing method embodiments.

It should be understood that units in the communication apparatus 900 and the foregoing other operations and/or functions are separately used to implement corresponding procedures in the foregoing figures.

It should be understood that a specific process in which the units perform the foregoing corresponding steps is described in detail in the foregoing method embodiments. For brevity, details are not described herein again.

As an example description, the communication apparatus 900 can implement actions, steps, or methods related to the AMF network element in S401, S402, and S403 in the foregoing method embodiment.

It should be understood that the foregoing content is merely some example configurations. The communication apparatus 900 can further implement other additional steps, actions, or methods related to the AMF network element in the foregoing method embodiments. Details are not described herein again.

It should be understood that for different network elements in the foregoing method embodiments, the communication apparatus 900 corresponds to different network elements. For example, the communication apparatus 900 may correspond to an NEF network element, or may correspond to an NWADF network element, and respectively perform corresponding actions.

It should be understood that an example process in which the units perform the foregoing corresponding steps is described in detail in the foregoing method embodiments. For brevity, details are not described herein again.

In another possible design, the communication apparatus 900 may be a radio access management controller in the foregoing method embodiments, or may be a chip configured to implement a function of the radio access management controller in the foregoing method embodiments.

It should be understood that the communication apparatus 900 may correspond to the radio access management controller in method embodiments of this application, and the communication apparatus 900 may include units (e.g., circuits) configured to perform the methods performed by the radio access management controller in the foregoing method embodiments.

In addition, the units in the communication apparatus 900 and the foregoing other operations and/or functions are separately utilized to implement the corresponding procedures in the foregoing method embodiments.

It should be understood that a specific process in which the units perform the foregoing corresponding steps is described in detail in the foregoing method embodiments. For brevity, details are not described herein again.

In still another example description, the communication apparatus 900 can implement additional actions, steps, or methods related to the radio access management controller in the foregoing method embodiments, and can also implement the actions, steps, or methods related to the radio access management controller in the foregoing method embodiments.

It should be understood that the foregoing content is merely some example embodiments. The communication apparatus 900 can further implement other additional steps, actions, or methods related to the radio access management controller in the foregoing method embodiments. Details are not described herein again.

It should be understood that a specific process in which the units perform the foregoing corresponding steps is described in detail in the foregoing method embodiments. For brevity, details are not described herein again.

In still another possible design, the communication apparatus 900 may be a wireless network device in the foregoing method embodiments, or may be a chip configured to implement a function of the wireless network device in the foregoing method embodiments.

It should be understood that the communication apparatus 900 may correspond to the wireless network device in method embodiments of this application, and the communication apparatus 900 may include units (e.g., circuits) configured to perform the methods performed by the wireless network device in FIG. 4 to FIG. 8.

It should be understood that the units in the communication apparatus 900 and the foregoing other operations and/or functions are separately utilized to implement corresponding procedures in FIG. 4 to FIG. 8.

As an example description, the communication apparatus 900 can implement an action, a step, or a method related to the wireless network device in S406 in the foregoing method embodiment, and can also implement additional actions, steps, or methods related to the wireless network device in the foregoing method embodiments.

It should be understood that the foregoing content is merely an example understanding of various configurations of the communication apparatus 900. The communication apparatus 900 can further implement other steps, actions, or methods related to the wireless network device in the foregoing method embodiments. Details are not described herein again.

It should be understood that a specific process in which the units perform the foregoing corresponding steps is described in detail in the foregoing method embodiments. For brevity, details are not described herein again.

In another possible design, the communication apparatus 900 may be a radio access intelligent controller in the foregoing method embodiments, or may be a chip configured to implement a function of the radio access intelligent controller in the foregoing method embodiments.

It should be understood that the communication apparatus 900 may correspond to the radio access intelligent controller in method embodiments of this application, and the communication apparatus 900 may include units (e.g., circuits) configured to perform methods performed by the radio access intelligent controller in the foregoing method embodiments.

It should be understood that the units in the communication apparatus 900 and the foregoing other operations and/or functions are separately used to implement corresponding procedures in the foregoing method embodiments.

It should be understood that a specific process in which the units perform the foregoing corresponding steps is described in detail in the foregoing method embodiments. For brevity, details are not described herein again.

In another possible design, the communication apparatus 900 may be an OAM network element in the foregoing method embodiments, or may be a chip configured to implement a function of the OAM network element in the foregoing method embodiments.

It should be understood that the communication apparatus 900 may correspond to the OAM network element in method embodiments of this application, and the communication apparatus 900 may include units configured to perform methods performed by the OAM network element in FIG. 7.

It should be understood that the units in the communication apparatus 900 and the foregoing other operations and/or functions are separately used to implement corresponding procedures in FIG. 7.

It should be understood that a specific process in which the units perform the foregoing corresponding steps is described in detail in the foregoing method embodiments. For brevity, details are not described herein again.

In another possible design, the communication apparatus 900 may be an NEF network element in the foregoing method embodiments, or may be a chip configured to implement a function of the NEF network element in the foregoing method embodiments.

It should be understood that the communication apparatus 900 may correspond to the NEF network element in method embodiments of this application, and the communication apparatus 900 may include units configured to perform methods performed by the NEF network element in the foregoing method embodiments.

It should be understood that the units in the communication apparatus 900 and the foregoing other operations and/or functions are separately used to implement corresponding procedures in the foregoing method embodiments.

It should be understood that a specific process in which the units perform the foregoing corresponding steps is described in detail in the foregoing method embodiments. For brevity, details are not described herein again.

In another possible design, the communication apparatus 900 may be an AMF network element in the foregoing method embodiments, or may be a chip configured to implement a function of the AMF network element in the foregoing method embodiments.

It should be understood that the communication apparatus 900 may correspond to the AMF network element in method embodiments of this application, and the communication apparatus 900 may include units configured to perform methods performed by the AMF network element in the foregoing method embodiments.

It should be understood that the units (e.g., circuits) in the communication apparatus 900 and the foregoing other operations and/or functions are separately utilized to implement corresponding procedures in the foregoing method embodiments.

It should be understood that a specific process in which the units perform the foregoing corresponding steps is described in detail in the foregoing method embodiments. For brevity, details are not described herein again.

It should further be understood that the transceiver unit 910 in the communication apparatus 900 may correspond to a transceiver 1020 in a communication device 1000 shown in FIG. 10, and the processing unit 920 in the communication apparatus 900 may correspond to a processor 1010 in the communication device 1000 shown in FIG. 10.

It should further be understood that when the communication apparatus 900 is a chip, the chip includes a transceiver unit and a processing unit. The transceiver unit may be an input/output circuit or a communication interface, and the processing unit may be a processor, a microprocessor, or an integrated circuit integrated on the chip.

The transceiver unit 910 is configured to implement a signal receiving/sending operation of the communication apparatus 900, and the processing unit 920 is configured to implement a signal processing operation of the communication apparatus 900.

Optionally, the communication apparatus 900 further includes a storage unit 930 (e.g., storage circuit), and the storage unit 930 is configured to store instructions.

FIG. 10 is a schematic block diagram of a communication device 1000 according to an embodiment of this application. As shown in the figure, the communication device 1000 includes at least one processor 1010 and a transceiver 1020.

The processor 1010 is coupled to a memory, and is configured to execute instructions stored in the memory, to control the transceiver 1020 to send a signal and/or receive a signal.

Optionally, the communication device 1000 further includes a memory 1030 configured to store the instructions.

It should be understood that the processor 1010 and the memory 1030 may be integrated into a processing apparatus. The processor 1010 is configured to execute program code stored in the memory 1030, to implement the foregoing functions.

During implementation, the memory 1030 may also be integrated into the processor 1010, or may be independent of the processor 1010.

It should further be understood that the transceiver 1020 may include a receiver (or referred to as a receiver machine) and a transmitter (or referred to as a transmitter machine).

The transceiver 1020 may further include an antenna. There may be one or more antennas. The transceiver 1020 may be a communication interface or an interface circuit.

When the communication device 1000 is a chip, the chip includes a transceiver unit and a processing unit. The transceiver unit may be an input/output circuit or a communication interface, and the processing unit may be a processor, a microprocessor, or an integrated circuit integrated on the chip.

An embodiment of this application further provides a processing apparatus that includes a processor and an interface. The processor may be configured to perform the method in the foregoing method embodiments.

It should be understood that the foregoing processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processing circuit (DSP), a micro controller (MCU), a programmable controller (PLD), or another integrated chip.

In an implementation process, the steps in the foregoing methods may be implemented by using an integrated logic circuit of hardware in the processor or by using instructions in a form of software.

The steps of the methods disclosed with reference to embodiments of this application may be directly performed and completed by a hardware processor, or may be performed and completed by using a combination of hardware in the processor and a software module.

The software module may be located in a mature storage medium in the art such as a random access memory (RAM), a flash memory, a read-only memory (ROM), a programmable read-only memory (PROM), an electrically erasable programmable memory (EEPROM), or a register.

The storage medium is located in the memory. The processor reads information in the memory and completes the steps of the foregoing methods in combination with the hardware of the processor. To avoid repetition, details are not described herein again.

An embodiment of this application further provides a computer-readable storage medium. The computer-readable storage medium stores computer instructions used to implement a method performed by a radio access management controller in the foregoing method embodiments.

For example, when a computer program is executed by a computer, the computer is enabled to implement the method performed by the radio access management controller in the foregoing method embodiments.

An embodiment of this application further provides a computer-readable storage medium. The computer-readable storage medium stores computer instructions used to implement a method performed by an AMF network element in the foregoing method embodiments.

For example, when a computer program is executed by a computer, the computer is enabled to implement the method performed by the AMF network element in the foregoing method embodiments.

An embodiment of this application further provides a computer-readable storage medium. The computer-readable storage medium stores computer instructions used to implement a method performed by a radio access intelligent controller in the foregoing method embodiments.

For example, when a computer program is executed by a computer, the computer is enabled to implement the method performed by the radio access intelligent controller in the foregoing method embodiments.

An embodiment of this application further provides a computer-readable storage medium. The computer-readable storage medium stores computer instructions used to implement a method performed by a wireless network device in the foregoing method embodiments.

For example, when a computer program is executed by a computer, the computer is enabled to implement the method performed by the wireless network device in the foregoing method embodiments.

An embodiment of this application further provides a computer-readable storage medium. The computer-readable storage medium stores computer instructions used to implement a method performed by an NEF network element in the foregoing method embodiments.

For example, when a computer program is executed by a computer, the computer is enabled to implement the method performed by the NEF network element in the foregoing method embodiments.

An embodiment of this application further provides a computer-readable storage medium. The computer-readable storage medium stores computer instructions used to implement a method performed by an OAM network element in the foregoing method embodiments.

For example, when a computer program is executed by a computer, the computer is enabled to implement the method performed by the OAM network element in the foregoing method embodiments.

An embodiment of this application further provides a computer program product including instructions. When the instructions are executed by a computer, the computer is enabled to implement a method performed by a radio access management controller, a first network element, a radio access intelligent controller, a wireless network device, an AMF network element, an NEF network element, or an OAM network element in the foregoing method embodiments.

An embodiment of this application further provides a chip system or a processor. The chip system or the processor is configured to invoke a computer program from a memory and run the computer program, so that a communication device in which the chip system is installed performs a method that should be performed by a radio access management controller, or performs a method that should be performed by a radio access intelligent controller, or performs a method that should be performed by a wireless network device, or performs a method that should be performed by an AMF network element, or performs a method that should be performed by an NEF network element, or performs a method that should be performed by an OAM network element.

An embodiment of this application further provides a communication system. The communication system includes an AMF network element, a radio access management controller, and a wireless network device.

The AMF network element is configured to perform steps of a method performed by the AMF network element in the foregoing method embodiments, the radio access management controller is configured to perform steps of a method performed by the radio access management controller in the foregoing method embodiments, and the wireless network device is configured to perform steps of a method performed by the wireless network device in the foregoing method embodiments.

Optionally, the communication system may further include a radio access intelligent controller, and the radio access intelligent controller is configured to perform steps of a method performed by the radio access intelligent controller in the foregoing method embodiments.

Optionally, the communication system may further include an AS, and the AS is configured to perform steps of a method performed by the AS in the foregoing method embodiments.

An embodiment of this application further provides a communication system. The communication system includes an AMF network element and a wireless network device. The AMF network element is configured to perform steps of a method performed by the AMF network element in the foregoing method embodiments, and the wireless network device is configured to perform steps of a method performed by the wireless network device in the foregoing method embodiments.

Optionally, the communication system may further include an AS, and the AS is configured to perform steps of a method performed by the AS in the foregoing method embodiments.

Optionally, the communication system may further include an NEF network element, and the NEF network element is configured to perform steps of a method performed by the NEF network element in the foregoing method embodiments.

An embodiment of this application further provides a communication system. The communication system includes an OAM network element and a wireless network device. The OAM network element is configured to perform steps of a method performed by the OAM network element in the foregoing method embodiments, and the wireless network device is configured to perform steps of a method performed by the wireless network device in the foregoing method embodiments.

Optionally, the communication system further includes an AMF network element, and the AMF network element is configured to perform steps of a method performed by the AMF network element in the foregoing method embodiments.

Optionally, the communication system may further include an AS, and the AS is configured to perform steps of a method performed by the AS in the foregoing method embodiments.

It may be clearly understood by a person skilled in the art that, for the purpose of convenient and brief description, for explanations on and beneficial effect of related content in any communication apparatus provided above, refer to corresponding method embodiments provided above. Details are not described herein again.

A structure of an execution body of the method provided in embodiments of this application is not limited in embodiments of this application, provided that a program that records code for the method provided in embodiments of this application can be run to perform communication based on the method provided in embodiments of this application.

For example, the execution body of the method provided in embodiments of this application may be a terminal device, a network device, or a function module that is in the terminal device or the network device and that can invoke and execute the program.

Aspects or features of this application may be implemented as a method, an apparatus, or a product that uses standard programming and/or engineering technologies. The term "product" used in this specification may cover a computer program that may be accessed from any computer-readable component, carrier, or medium.

The computer-readable storage medium may be any usable medium accessible by a computer, or a data storage device, such as a server or a data center, integrating one or more usable media.

The usable medium (or the computer-readable medium) may include, for example, but is not limited to, various media that may store program code such as a magnetic medium or a magnetic storage device (for example, a floppy disk, a hard disk (for example, a removable hard disk), or a magnetic tape), an optical medium (for example, an optical disc, a compact disc (CD), or a digital versatile disc (digital versatile disc, DVD)), a smart card and a flash memory device (for example, an erasable programmable read-only memory (EPROM), a card, a stick, or a key drive), or a semiconductor medium (for example, a solid state disk (SSD), a USB flash drive, a ROM, or a RAM).

Various storage media described in this specification may represent one or more devices and/or other machine-readable media that are configured to store information. The term "machine-readable media" may include but is not limited to a radio channel and various other media that can store, include, and/or carry instructions and/or data.

It should be understood that the memory mentioned in embodiments of this application may be a volatile memory or a nonvolatile memory, or may include both a volatile memory and a nonvolatile memory.

The non-volatile memory may be a ROM, a PROM, an EPROM, an EEPROM, or a flash memory. The volatile memory may be a RAM. For example, the RAM may be used as an external cache.

As an example instead of a limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or transistor logic device, or a discrete hardware component, the memory (e.g., storage module) may be integrated into the processor.

It should further be noted that the memory described in this specification aims to include but is not limited to these memories and any memory of another proper type.

In the several embodiments provided in this application, it should be understood that the disclosed apparatus and method may be implemented in other manners.

For example, the foregoing apparatus embodiments are merely examples. For example, division into the foregoing units is merely logical function division, and may be another division manner during actual implementation. For example, a plurality of units or components may be combined or integrated into another system, or some features may be ignored or not performed.

In addition, the displayed or discussed mutual couplings, direct couplings, or communication connections may be implemented through some interfaces. Indirect couplings or communication connections between the apparatuses or units may be implemented in electronic, mechanical, or other forms.

The foregoing units described as separate parts may or may not be physically separate, and parts displayed as units may or may not be physical units, that is, may be located in one place, or may be distributed on a plurality of network units. Some or all of the units may be selected based on actual requirements to implement the solutions provided in this application.

In addition, functional units in embodiments of this application may be integrated into one processing unit, or each of the units may exist alone physically, or two or more units may be integrated into one unit.

All or some of the foregoing embodiments may be implemented by using software, hardware, firmware, or any combination thereof.

When software is used to implement embodiments, all or some of embodiments may be implemented in a form of a computer program product. The computer program product includes one or more computer instructions.

When computer program instructions are loaded and executed on a computer, all or some of the procedures or functions according to embodiments of this application are generated. The computer may be a general-purpose computer, a dedicated computer, a computer network, or another programmable apparatus.

For example, the computer may be a personal computer, a server, or a network device. The computer instructions may be stored in a computer-readable storage medium or may be transmitted from one computer-readable storage medium to another computer-readable storage medium.

For example, the computer instructions may be transmitted from one website, computer, server, or data center to another web site, computer, server, or data center in a wired (for example, a coaxial cable, an optical fiber, or a digital subscriber line) or wireless (for example, infrared, radio, or microwave) manner. For the computer-readable storage medium, refer to the foregoing descriptions.

It should be understood that in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that in this application, both "when" and "if" mean that a network element performs corresponding processing in an objective situation and do not constitute a limitation on time. The terms do not mean that the network element is required to have a determining action during implementation, and do not mean any other limitation.

It should be understood that in embodiments of this application, "B corresponding to A" indicates that B is associated with A, and B may be determined based on A. However, it should be further understood that determining B based on A does not mean that B is determined only based on A, and B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving, by an access and mobility management function network element from a network exposure function network element, a first correspondence between a first identifier and a quality of experience (QoE) target, wherein the first correspondence comprises the first identifier, the first identifier is associated with a first terminal device at an application layer, and the QoE target indicates a service QoE target of the first terminal device;

determining, by the access and mobility management function network element, a second identifier based on the first identifier, wherein the second identifier is associated with the first terminal device in a network layer; and sending, by the access and mobility management function network element to a wireless network device that is configured to serve the first terminal device and to identify the first terminal device based on the second identifier, a second correspondence between the second identifier and the QoE target.

2. The method according to claim 1, wherein the determination, by the access and mobility management function network element, of the second identifier based on the first identifier comprises:

determining, by the access and mobility management function network element, an international mobile subscriber identity (IMSI) of the first terminal device based on the first identifier; and determining, by the access and mobility management function network element, the second identifier based on the IMSI.

3. The method according to claim 1, wherein the QoE target is used to determine an optimization policy of the first terminal device, and the optimization policy is used to enable a QoE of the first terminal device to achieve the QoE target.

4. A communication method, comprising:

receiving, by a first device, a first identifier and a quality of experience (QoE) target from an application server (AS), wherein the first identifier is associated with a first terminal device at an application layer, and the QoE target indicates a service QoE target of the first terminal device;

sending, by the first device, the first identifier to an access and mobility management function network element;

receiving, by the first device, a second identifier from the access and mobility management function network element, wherein the second identifier is associated with the first terminal device in a network layer; and sending, by the first device, a correspondence between the second identifier and the QoE target to a wireless network device that is configured to serve the first terminal device and to identify the first terminal device based on the second identifier.

5. The method according to claim 4, wherein the sending, by the first device, the correspondence between the second identifier and the QoE target comprises:

when the first device is an operation, administration, and maintenance (OAM) network element, sending, by the OAM network element, the correspondence to the wireless network device; or when the first device is a radio access management controller, sending, by the radio access management controller, the correspondence to a radio access intelligent controller.

6. The method according to claim 4, wherein the method further comprises:

receiving, by the first device, location information of the first terminal device.

7. The method according to claim 4, wherein the QoE target is used to determine an optimization policy of the first terminal device, and the optimization policy is used to enable a QoE of the first terminal device to achieve the QoE target.

8. The method according to claim 4, wherein the method further comprises:

sending, by the first device, second identifier type information to the access and mobility management function network element, wherein the second identifier type information indicates a type of the second identifier of the first terminal device.

9. A communication method, comprising:

receiving, by a radio access management controller, a first identifier and a quality of experience (QoE) target from an application server (AS), wherein the first identifier is associated with a first terminal device at an application layer, and the QoE target indicates a service QoE target of the first terminal device;

sending, by the radio access management controller, the first identifier to an access and mobility management function network element;

receiving, by the radio access management controller, a second identifier from the access and mobility management function network element, wherein the second identifier is associated with the first terminal device in a network layer;

sending, by the radio access management controller, the second identifier to a wireless network device, wherein the second identifier is used to request data of the first terminal device;

receiving, by the radio access management controller, the data from the wireless network device;

determining, by the radio access management controller, an optimization policy based on the data and the QoE target, wherein the optimization policy is used to enable a QoE of the first terminal device to achieve the QoE target; and sending, by the radio access management controller, the optimization policy to a radio access intelligent controller.

10. The method according to claim 9, wherein the method further comprises:

receiving, by the radio access management controller, location information of the first terminal device.

11. The method according to claim 9, wherein the method further comprises:

sending, by the radio access management controller, the second identifier type information to the access and mobility management function network element, wherein the second identifier type information indicates a type of the second identifier of the first terminal device.

12. A communication apparatus comprising at least one processor, wherein the at least one processor is configured to execute a computer program stored in a memory, and when executing the computer program, the apparatus is configured to implement the method according to claim 1.

13. A computer-readable storage medium comprising a computer program stored on non-transitory memory, wherein when the computer program is executed, the method of claim 1 is implemented.

14. A chip system that comprises a processor, wherein the at least one processor is configured to execute a computer program stored in a memory, and when executing the computer program, the chip system is configured to implement the method according to claim 1.

15. The method according to claim 9, wherein the optimization policy comprises:

performing a hand over of the first terminal device from a current cell to a neighboring cell capable of enabling the QoE of the first terminal device to achieve the QoE target.

16. The method according to claim 9, wherein the optimization policy comprises:

allocating additional transmission resources to the first terminal device to enable the QoE of the first terminal device to achieve the QoE target.

17. The method according to claim 9, wherein the optimization policy comprises:

establishing dual connectivity with the first terminal to enable the QoE of the first terminal device to achieve the QoE target.

* * * * *